(12) United States Patent
Raghavan et al.

(10) Patent No.: US 11,219,027 B2
(45) Date of Patent: Jan. 4, 2022

(54) METHODS FOR BEAM MANAGEMENT IN MILLIMETER WAVE RELAYS

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Tianyang Bai, Bridgewater, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 16/733,861

(22) Filed: Jan. 3, 2020

(65) Prior Publication Data

US 2021/0212051 A1 Jul. 8, 2021

(51) Int. Cl.
*H04W 4/00* (2018.01)
*H04W 72/04* (2009.01)
(Continued)

(52) U.S. Cl.
CPC ........ *H04W 72/048* (2013.01); *H04B 7/0617* (2013.01); *H04W 8/005* (2013.01); *H04W 16/28* (2013.01); *H04W 76/14* (2018.02)

(58) Field of Classification Search
CPC ... H04W 72/048; H04W 76/14; H04W 8/005; H04W 16/28; H04B 7/0617
(Continued)

(56) References Cited

U.S. PATENT DOCUMENTS 9,253,592 B1 * 2/2016 Moscovich ........... H04W 16/28
10,154,531 B2 12/2018 Liao et al.
(Continued)

FOREIGN PATENT DOCUMENTS

| CN | 107276698 A | 10/2017 |
|---|---|---|
| WO | WO-2019009454 A1 | 1/2019 |
| WO | WO-2019174532 A1 | 9/2019 |

OTHER PUBLICATIONS

FUTUREWEI: "Views on Sidelink Enhancements in Rel-17", 3GPP Draft, 3GPP TSG RAN Meeting #86, RP-192683, 3rd Generation Partnership Project (3GPP), Mobile Competence Centre, 650, Route Des Lucioles, F-06921 Sophia-Antipolis Cedex, France, vol. TSG RAN, No. Sitges, Spain, 20191209-20191212, Dec. 2, 2019 (Dec. 2, 2019), XP051834290, 8 Pages, Retrieved from the Internet: URL: https://ftp.3gpp.org/tsg_ran/TSG_RAN/TSGR_86/Docs/RP-192683.zip. RP-192683.docx [retrieved on Dec. 2, 2019] Section 2.5.
(Continued)

*Primary Examiner* — Marceau Milord
(74) *Attorney, Agent, or Firm* — Holland & Hart LLP

(57) ABSTRACT

Methods, systems, and devices for wireless communications are described. A user equipment (UE) may receive configuration information from a base station that indicates a set of resources for the UE to establish sidelink communications with another UE in a wireless network. The UE may transmit a first set of reference signals using a first set of beams to determine a set of neighboring candidate UEs for a sidelink connection. The UE may then transmit a second set of reference signals on a second set of beams to the neighboring candidate UEs, and may select a second UE located in the determined neighboring set using various beam scanning procedures. The UE may identify a transmit beam associated with the second UE, and may establish the sidelink connection using the identified transmit beam.

30 Claims, 20 Drawing Sheets

(51) Int. Cl.
*H04W 76/14* (2018.01)
*H04B 7/06* (2006.01)
*H04W 8/00* (2009.01)
*H04W 16/28* (2009.01)

(58) Field of Classification Search
USPC ........................................ 370/329, 435, 331
See application file for complete search history.

(56) References Cited

U.S. PATENT DOCUMENTS

| 10,536,209 | B2* | 1/2020 | Cezanne | H04B 7/0626 |
| 2013/0287064 | A1* | 10/2013 | Seo | H04L 5/0073 375/144 |
| 2016/0112173 | A1* | 4/2016 | Wang | H04B 7/04 370/329 |
| 2017/0041974 | A1* | 2/2017 | Liao | H04W 8/005 |
| 2017/0302355 | A1* | 10/2017 | Islam | H04W 72/042 |
| 2018/0006706 | A1* | 1/2018 | Cheng | H04B 7/0617 |
| 2018/0042045 | A1* | 2/2018 | Choi | H04W 74/08 |
| 2018/0146419 | A1 | 5/2018 | Raghavan et al. | |
| 2018/0205440 | A1* | 7/2018 | Enescu | H04B 7/0417 |
| 2018/0279213 | A1* | 9/2018 | Raghavan | H04B 7/0408 |
| 2019/0124698 | A1 | 4/2019 | Wu et al. | |
| 2019/0174346 | A1 | 6/2019 | Murray et al. | |
| 2019/0253899 | A1* | 8/2019 | Shi | H04W 48/16 |
| 2019/0261193 | A1* | 8/2019 | Torsner | H04W 16/28 |
| 2019/0281587 | A1* | 9/2019 | Zhang | H04L 5/0053 |
| 2019/0364590 | A1* | 11/2019 | Sartori | H04W 72/14 |
| 2020/0178221 | A1* | 6/2020 | Byun | H04W 72/12 |
| 2020/0260310 | A1* | 8/2020 | Kim | H04W 80/02 |
| 2020/0343951 | A1* | 10/2020 | Hou | H04W 72/04 |
| 2020/0373993 | A1* | 11/2020 | Wu | H04B 17/318 |
| 2021/0127377 | A1* | 4/2021 | Lee | H04L 5/0048 |

OTHER PUBLICATIONS

International Search Report and Written Opinion—PCT/US2020/067108—ISA/EPO—dated Apr. 20, 2021.

* cited by examiner

METHODS FOR BEAM MANAGEMENT IN MILLIMETER WAVE RELAYS

FIELD OF TECHNOLOGY

The following relates generally to wireless communications and more specifically to methods for beam management in millimeter wave relays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may use millimeter wave (mmW) transmissions for wireless communications. Techniques such as mmW relaying may be employed to extend signaling range and coverage extension, providing a more uniform quality of service across communications in the system. In some cases, however, wireless communications at these frequencies may be associated with increased signal attenuation and shorter signal propagation distances.

Various techniques may be used to enhance communications and overcome such challenges. In some examples, a relay device may enhance throughput or provide extended coverage between a base station and a UE. During mmW relaying, a first UE may set up a relay link with a second UE in the network. In some examples, the relay link may be a sidelink connection between the first UE and the second UE that forms at least a portion of a link between a source device and a destination device, either or both of which may be the first UE or the second UE, and the first UE may communicate with the second UE directly. In some cases, however, the number of candidate relays (e.g., UEs) in a network, interference or blockage, and other factors may pose a challenge to efficient sidelink connection establishment between devices in the network.

SUMMARY

The described techniques relate to improved methods, systems, devices, and apparatuses that support methods for beam management in millimeter wave relays.

A method of wireless communication at a first UE is described. The method may include receiving a first set of reference signals during a sidelink establishment procedure, determining a set of candidate UEs based on a measurement of the received first set of reference signals, receiving, for the determined set of candidate UEs, a second set of reference signals on a set of receive beams during the sidelink establishment procedure, selecting, based on the received second set of reference signals, a second UE of the determined set of candidate UEs and a receive beam associated with the second UE, and establishing a sidelink connection with the second UE using the at least one receive beam.

An apparatus for wireless communication at a first UE is described. The apparatus may include a processor, memory coupled with the processor, and instructions stored in the memory. The instructions may be executable by the processor to cause the apparatus to receive a first set of reference signals during a sidelink establishment procedure, determine a set of candidate UEs based on a measurement of the received first set of reference signals, receive, for the determined set of candidate UEs, a second set of reference signals on a set of receive beams during the sidelink establishment procedure, select, based on the received second set of reference signals, a second UE of the determined set of candidate UEs and a receive beam associated with the second UE, and establish a sidelink connection with the second UE using the at least one receive beam.

Another apparatus for wireless communication at a first UE is described. The apparatus may include means for receiving a first set of reference signals during a sidelink establishment procedure, determining a set of candidate UEs based on a measurement of the received first set of reference signals, receiving, for the determined set of candidate UEs, a second set of reference signals on a set of receive beams during the sidelink establishment procedure, selecting, based on the received second set of reference signals, a second UE of the determined set of candidate UEs and a receive beam associated with the second UE, and establishing a sidelink connection with the second UE using the at least one receive beam.

A non-transitory computer-readable medium storing code for wireless communication at a first UE is described. The code may include instructions executable by a processor to receive a first set of reference signals during a sidelink establishment procedure, determine a set of candidate UEs based on a measurement of the received first set of reference signals, receive, for the determined set of candidate UEs, a second set of reference signals on a set of receive beams during the sidelink establishment procedure, select, based on the received second set of reference signals, a second UE of the determined set of candidate UEs and a receive beam associated with the second UE, and establish a sidelink connection with the second UE using the at least one receive beam.

In some examples of the method, apparatuses, and non-transitory computer-readable medium described herein, determining the set of candidate UEs based on the measurement of the received first set of reference signals may include operations, features, means, or instructions for measuring, for each reference signal of the first set of reference signals, a value of a parameter for the reference signal, transmitting the measured values to a base station, and receiving, from the base station, an indication of the set of candidate UEs.

In some examples of the method, apparatuses, and non-transitory computer-readable medium described herein, determining the set of candidate UEs based on the measurement of the received first set of reference signals may include operations, features, means, or instructions for measuring, for each reference signal of the first set of reference signals, a value of a parameter for the reference signal, and determining, by the first UE, the set of candidate UEs based on the measured values.

In some examples of the method, apparatuses, and non-transitory computer-readable medium described herein, selecting the receive beam further may include operations, features, means, or instructions for receiving a third set of reference signals on a narrower beamwidth set of receive beams than the receive beams of the set of receive beams used to receive the second set of reference signals, and selecting the receive beam from the narrower beamwidth set of receive beams.

Some examples of the method, apparatuses, and non-transitory computer-readable medium described herein may further include operations, features, means, or instructions for receiving configuration information for the sidelink establishment procedure from a base station serving a set of UEs, including the first UE and the set of candidate UEs.

In some examples of the method, apparatuses, and non-transitory computer-readable medium described herein, the configuration information indicates time-frequency resources for the first set of reference signals, where the first set of reference signals include synchronization signal blocks, sounding reference signals, channel state information reference signals, or sidelink discovery reference signals, or a combination thereof.

In some examples of the method, apparatuses, and non-transitory computer-readable medium described herein, the set of candidate UEs for the sidelink connection may be determined further based on a privacy or security parameter associated with the set of candidate UEs.

In some examples of the method, apparatuses, and non-transitory computer-readable medium described herein, each receive beam of a set of receive beams used to receive the first set of reference signals may be broader in beamwidth than each receive beam of the set of receive beams used to receive the second set of reference signals.

In some examples of the method, apparatuses, and non-transitory computer-readable medium described herein, each receive beam of a set of receive beams used to receive the first set of reference signals may have a lower array gain than each receive beam of the set of receive beams used to receive the second set of reference signals, where having the lower array gain includes having a lower received signal strength indicator, a lower reference signal received power, a lower reference signal received quality, a lower signal to noise ratio, or a lower signal to interference and noise ratio, or a combination thereof.

In some examples of the method, apparatuses, and non-transitory computer-readable medium described herein, the first set of reference signals may be received in a first radio frequency spectrum band, and the second set of reference signals may be received in a second radio frequency spectrum band different than the first radio frequency spectrum band.

A method of wireless communication at a second UE is described. The method may include transmitting a first set of reference signals during a sidelink establishment procedure, determining, at least in part in response to the transmitted first set of reference signals, a set of candidate UEs for a sidelink connection, the set of candidate UEs a subset of a set of UEs served by a base station, transmitting, for the determined set of candidate UEs, a second set of reference signals on a set of transmit beams during the sidelink establishment procedure, and establishing, with a first UE, the sidelink connection at least in part in response to the transmitted second set of reference signals.

An apparatus for wireless communication at a second UE is described. The apparatus may include a processor, memory coupled with the processor, and instructions stored in the memory. The instructions may be executable by the processor to cause the apparatus to transmit a first set of reference signals during a sidelink establishment procedure, determine, at least in part in response to the transmitted first set of reference signals, a set of candidate UEs for a sidelink connection, the set of candidate UEs a subset of a set of UEs served by a base station, transmit, for the determined set of candidate UEs, a second set of reference signals on a set of transmit beams during the sidelink establishment procedure, and establish, with a first UE, the sidelink connection at least in part in response to the transmitted second set of reference signals.

Another apparatus for wireless communication at a second UE is described. The apparatus may include means for transmitting a first set of reference signals during a sidelink establishment procedure, determining, at least in part in response to the transmitted first set of reference signals, a set of candidate UEs for a sidelink connection, the set of candidate UEs a subset of a set of UEs served by a base station, transmitting, for the determined set of candidate UEs, a second set of reference signals on a set of transmit beams during the sidelink establishment procedure, and establishing, with a first UE, the sidelink connection at least in part in response to the transmitted second set of reference signals.

A non-transitory computer-readable medium storing code for wireless communication at a second UE is described. The code may include instructions executable by a processor to transmit a first set of reference signals during a sidelink establishment procedure, determine, at least in part in response to the transmitted first set of reference signals, a set of candidate UEs for a sidelink connection, the set of candidate UEs a subset of a set of UEs served by a base station, transmit, for the determined set of candidate UEs, a second set of reference signals on a set of transmit beams during the sidelink establishment procedure, and establish, with a first UE, the sidelink connection at least in part in response to the transmitted second set of reference signals.

In some examples of the method, apparatuses, and non-transitory computer-readable medium described herein, selecting the transmit beam further may include operations, features, means, or instructions for transmitting a third set of reference signals on a narrower beamwidth set of transmit beams than the transmit beams of the set of transmit beams used to transmit the second set of reference signals, and selecting the transmit beam from the narrower beamwidth set of transmit beams.

Some examples of the method, apparatuses, and non-transitory computer-readable medium described herein may further include operations, features, means, or instructions for receiving configuration information for the sidelink establishment procedure from a base station serving a set of UEs, the set of UEs including the first UE, the second UE, and the set of candidate UEs.

In some examples of the method, apparatuses, and non-transitory computer-readable medium described herein, the configuration information indicates time-frequency resources for the first set of reference signals, where the first set of reference signals include synchronization signal blocks, sounding reference signals, channel state information reference signals, sidelink discovery reference signals, or a combination thereof.

In some examples of the method, apparatuses, and non-transitory computer-readable medium described herein, the set of candidate UEs for the sidelink connection may be determined further based on a privacy or security parameter associated with the set of candidate UEs.

In some examples of the method, apparatuses, and non-transitory computer-readable medium described herein, each transmit beam of a set of transmit beams used to transmit the first set of reference signals may be broader in beamwidth than each transmit beam of the set of transmit beams used to transmit the second set of reference signals.

In some examples of the method, apparatuses, and non-transitory computer-readable medium described herein, each transmit beam of a set of transmit beams used to transmit the first set of reference signals may have a lower array gain than each transmit beam of the set of transmit beams used to transmit the second set of reference signals, where having the lower array gain includes having a lower received signal strength indicator, a lower reference signal received power, a lower reference signal received quality, a lower signal to noise ratio, or a lower signal to interference and noise ratio, or a combination thereof.

In some examples of the method, apparatuses, and non-transitory computer-readable medium described herein, the first set of reference signals may be transmitted using pseudo- or quasi-omnidirectional beams that target and cover a broader spatial area.

In some examples of the method, apparatuses, and non-transitory computer-readable medium described herein, the first set of reference signals may be transmitted in a first radio frequency spectrum band, and the second set of reference signals may be transmitted in a second radio frequency spectrum band different than the first radio frequency spectrum band.

A method of wireless communication at a base station is described. The method may include determining, for a first UE of a set of UEs served by the base station, a value of at least one parameter for the first UE to use to identify, during a sidelink establishment procedure, a set of candidate UEs for a sidelink connection, determining a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection, and transmitting, to the UE, configuration information indicating the value of the at least one parameter and the determined set of resources.

An apparatus for wireless communication at a base station is described. The apparatus may include a processor, memory coupled with the processor, and instructions stored in the memory. The instructions may be executable by the processor to cause the apparatus to determine, for a first UE of a set of UEs served by the base station, a value of at least one parameter for the first UE to use to identify, during a sidelink establishment procedure, a set of candidate UEs for a sidelink connection, determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection, and transmit, to the UE, configuration information indicating the value of the at least one parameter and the determined set of resources.

Another apparatus for wireless communication at a base station is described. The apparatus may include means for determining, for a first UE of a set of UEs served by the base station, a value of at least one parameter for the first UE to use to identify, during a sidelink establishment procedure, a set of candidate UEs for a sidelink connection, determining a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection, and transmitting, to the UE, configuration information indicating the value of the at least one parameter and the determined set of resources.

A non-transitory computer-readable medium storing code for wireless communication at a base station is described. The code may include instructions executable by a processor to determine, for a first UE of a set of UEs served by the base station, a value of at least one parameter for the first UE to use to identify, during a sidelink establishment procedure, a set of candidate UEs for a sidelink connection, determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection, and transmit, to the UE, configuration information indicating the value of the at least one parameter and the determined set of resources.

Some examples of the method, apparatuses, and non-transitory computer-readable medium described herein may further include operations, features, means, or instructions for identifying that a distance between a first set of UEs of the set of UEs, including the UE, and a second set of UEs of the set of UEs fails to satisfy a threshold distance, and determining, based on the identifying, a second set of resources for the second set of UEs to use to transmit and receive reference signals during the sidelink establishment procedure, where the set of resources for the first set of UEs may be different from the second set of resources for the second set of UEs.

Some examples of the method, apparatuses, and non-transitory computer-readable medium described herein may further include operations, features, means, or instructions for where the set of resources for the first set of UEs and the second set of resources for the second set of UEs include one or more different waveform parameter values.

Some examples of the method, apparatuses, and non-transitory computer-readable medium described herein may further include operations, features, means, or instructions for determining a first position of one or more UEs of the first set of UEs and a second position of one or more UEs of the second set of UEs, where the distance between the first position and the second position fails to satisfy the threshold distance.

Some examples of the method, apparatuses, and non-transitory computer-readable medium described herein may further include operations, features, means, or instructions for determining, for each UE of the set of UEs, a position of the UE, and assigning, for each UE of the set of UEs, the UE to one of the first set of UEs, or the second set of UEs, or a third set of UEs, based on the position of the UE being at least the threshold distance from a reference UE of the set of UEs.

Some examples of the method, apparatuses, and non-transitory computer-readable medium described herein may further include operations, features, means, or instructions for identifying that a distance between a first set of UEs of the set of UEs, including the UE, and a second set of UEs of the set of UEs satisfies a threshold distance, and determining, based on the identifying, that the second set of UEs may be to use one or more of the set of resources that the first set of UEs may be to use to transmit and receive reference signals during the sidelink establishment procedure.

DETAILED DESCRIPTION

Figure 1:
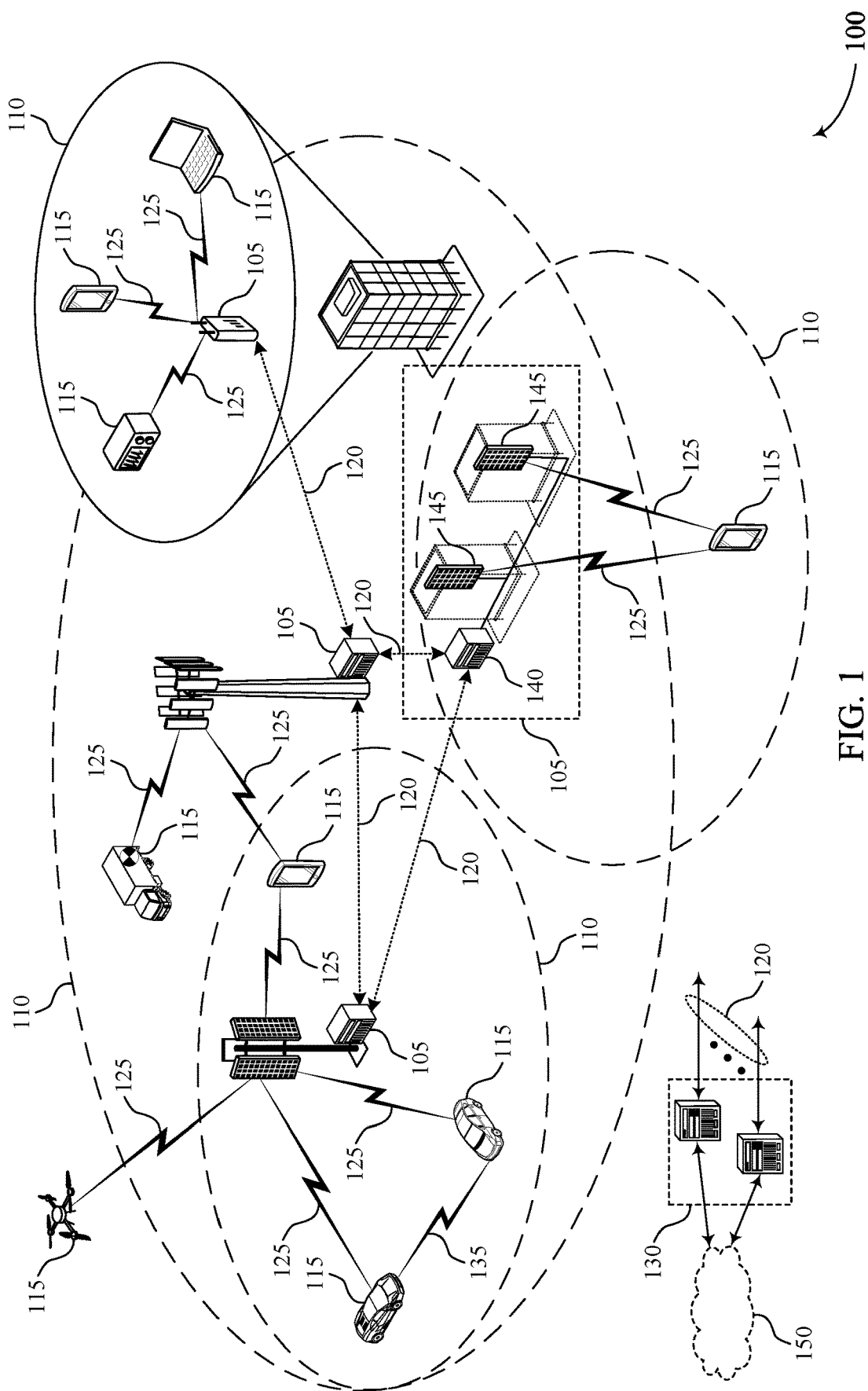
FIG. 1 illustrates an example of a system for wireless communications that supports methods for beam management in millimeter wave relays in accordance with aspects of the present disclosure.

Some wireless communications systems may operate in millimeter wave (mmW) frequency ranges (e.g., 28 GHz, 40 GHz, 60 GHz, etc.). In some cases, wireless communications at these frequencies may be associated with increased signal attenuation and shorter signal propagation distances. Various techniques such as relaying communications between devices via signal processing techniques such as beamforming may be used to enhance communications and overcome such challenges.

In some examples, the techniques described herein to establish a sidelink connection may be used as part of establishing a relay link that is a sidelink connection between a first UE and a second UE, the relay link forming at least a portion of a link between a source device and a destination device, either or both of which may be the first UE or the second UE. In such examples, the first UE and the second UE may be examples of relay devices. In other examples, the techniques described herein may be used to establish another type of sidelink connections between UEs.

A UE may utilize multiple antenna panels to increase array gains and maintain a stronger connection with a relay device in a network for sidelink communications. In one scenario, a number of UEs (e.g., N UEs) may be present in a coverage area served by a base station, where each UE may have multiple antenna panels in addition to an analog beam codebook of a given size that it may use for communications within the coverage area.

In some cases, a UE located in the group of N UEs may seek to establish a sidelink connection with one or more of the N UEs in the network. However, attempting to establish a sidelink connection with each of the N UEs using conventional establishment or beam management techniques may consume excess power and resources as well as suffer from increased latencies. Instead, the UE may identify a smaller subgroup of neighboring UEs (e.g., M UEs, where M<N) for communication before seeking to establish the sidelink connection between a selected relay candidate within the subgroup. This way, the UE may determine suitable candidates for establishing a sidelink connection from a smaller subgroup M, without assessing all of the numerous possible links between each UE in the larger group N.

The UE may utilize a procedure for discovering neighboring UEs within the group of M UEs, and establishing sidelinks (e.g., relay) links between one or more UEs in the group. In a first step, the UE may use a smaller set of beams for neighbor UE discovery, where each neighbor UE may be a potential candidate relay device. For example, the UE may use a beam set of size $K_1$ from a full analog codebook of size K that the UE uses for communication. In some cases, $K_1$ may be significantly smaller than K. For example, the set of beams $K_1$ may include pseudo-omnidirectional or quasi-omnidirectional beams which may have broader beamwidth and reduced array gains for discovering neighbor UEs at lower latencies.

In a second step, the UE may use a larger set of beams (e.g., of size K) to discover and establish a connection with one (or more) of the neighboring UEs of the determined subset of M UEs according to various beam scanning methods. In some cases, the UE may use directional beams with increased array gains during the second step. A base station may configure or otherwise set up beam training reference signals (RSs) between the UE and each candidate relay UE in the subgroup of UEs. The UE may then transmit to each candidate relay UE individually (e.g., the UE transmits and one other candidate relay node listens). In another example, the UE may transmit to the group of candidate relay UEs (e.g., the UE transmits, and all candidate relay nodes listen). The UE may select a candidate relay UE based on signal strength and beam refinement methods in the second step. The UE may also perform beam training and management using the techniques described herein.

Aspects of the disclosure are initially described in the context of wireless communications systems. The wireless communications system may enable the establishment of a sidelink connection between UEs present in the network, and may reduce the number of resources used to establish the connection. Aspects of the disclosure are further illustrated by and described with reference to apparatus diagrams, system diagrams, and flowcharts that relate to methods for beam management in millimeter wave relays.

FIG. 1 illustrates an example of a wireless communications system 100 that supports methods for beam management in millimeter wave relays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s$, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 using a sidelink connection 135, for example over a device-to-device (D2D) communication link (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the sidelink connection 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may utilize multiple antenna panels to increase array gains and maintain a stronger connection with a relay device in a network for sidelink communications. In one scenario, a total number of UEs may be present in a coverage area served by a base station 105, where each UE 115 may have multiple antenna panels in addition to an analog beam codebook of a given size that it may use for communications within the coverage area.

In some cases, a UE 115 may seek to establish a sidelink connection with one or more of the UEs present in the network. However, attempting to communicate with and establish a sidelink connection with each of the total number of UEs may consume excess power and resources as the UE 115 may poll each of the UEs present in a coverage area. Instead, the UE 115 may determine a smaller subgroup of neighboring UEs before performing beam scanning processes to establish the sidelink connection. As a result, the UE 115 may identify candidates for establishing a sidelink connection from a smaller subgroup without assessing possible links between every UE in the larger group. The UE 115 may utilize various different procedures for discovering neighboring UEs within the total group of UEs, and for establishing a sidelink between one or more UEs in the neighboring group.

First, UE 115 may use a smaller set of beams and may use beams with smaller beamwidths (e.g., pseudo-omni or quasi-omni beams) for neighbor UE discovery. For example UE 115 may use a full analog codebook with size K, but may determine to use a beam set of size $K_1$ from the full set. In some cases, $K_1$ may be significantly smaller than K.

Next, UE 115 may use a larger set of beams (e.g., of size K) to discover and establish a connection with one or more neighboring UEs of the determined subset of UEs according to various beam scanning methods. In one example, a base station may set up beam training reference signals (RSs) between the UE 115 and each candidate relay UE, and may transmit the RSs as part of configuration information to the UE 115. UE 115 may then transmit to each candidate relay UE individually (e.g., the UE transmits and one other candidate relays listens). In another example, the UE may transmit to the group of candidate relay UEs (e.g., the UE transmits, and all candidate relays listen). UE 115 may select a candidate relay UE based on signal strength and beam refinement methods in the second step, which may include beam training processes using beams of narrower beamwidths and increased array gains. UE 115 may establish a sidelink connection with the selected candidate relay UE using the refined beam, and may communicate on the sidelink.

Figure 2:
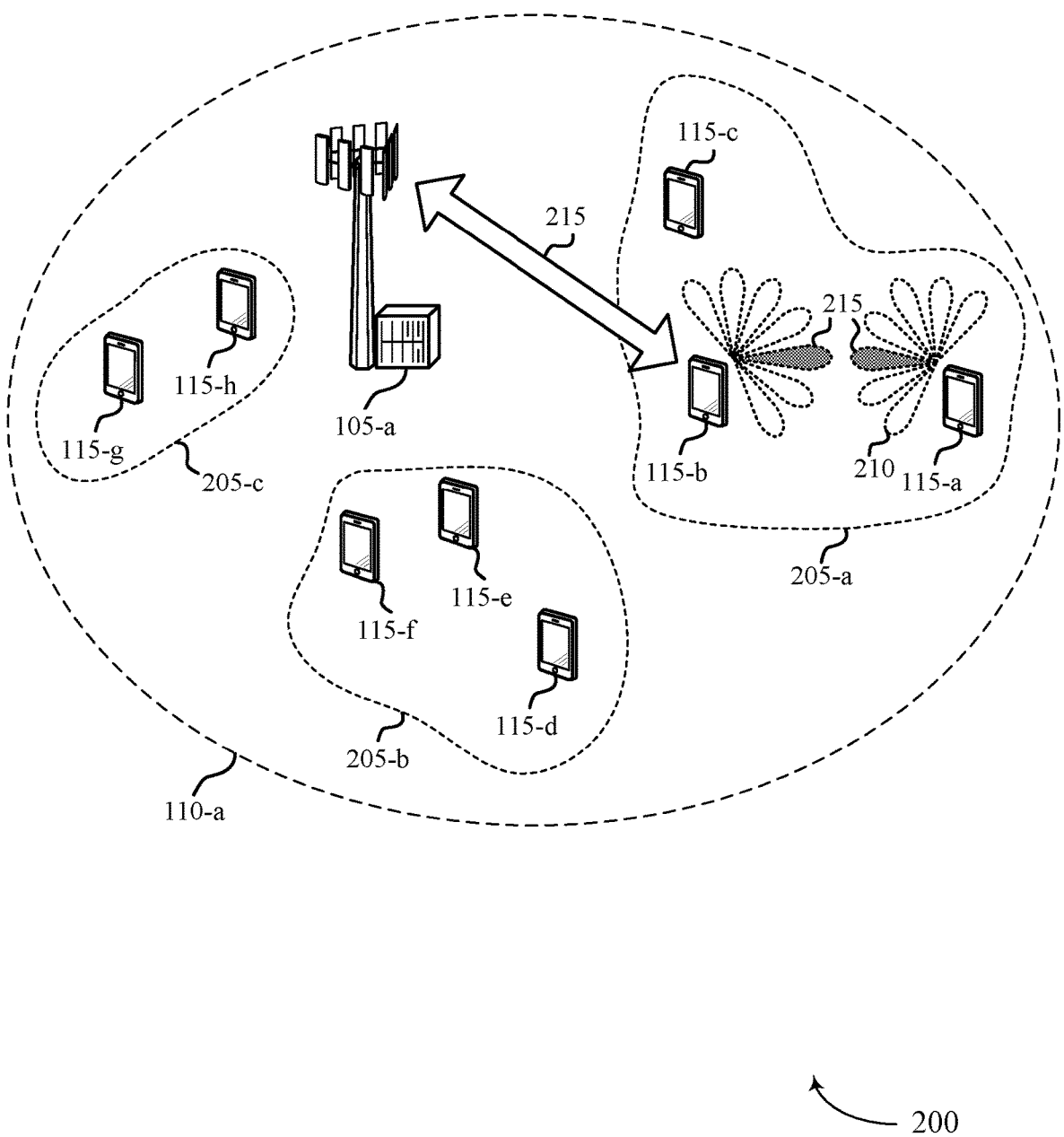
FIG. 2 illustrates an example of a wireless communications system that supports methods for beam management in millimeter wave relays in accordance with aspects of the present disclosure.

FIG. 2 illustrates an example of a wireless communications system 200 that supports methods for beam management in millimeter wave relays in accordance with aspects of the present disclosure. In some examples, wireless communications system 200 may implement aspects of wireless communications system 100. Aspects of wireless communications system 200 may be implemented by a transmitting device and/or a receiving device, which may be examples of a base station 105-a and/or a UE 115, as described herein.

In some wireless communications systems, a user equipment (UE) 115 may operate in various different frequency bands, including those configured for millimeter wave (mmW) frequencies generally (e.g., about 30 GHz to 300 GHz), or a specific set of mmW frequencies, such as Frequency Range 2 (FR2) (e.g., from 24.25 GHz to 52.6 GHz), and the like. A UE 115 may implement various techniques such as beamforming and spatial multiplexing at multiple antenna arrays to enhance signaling quality and reliability within the system. In addition, the UE 115 may utilize mmW relaying to extend signaling range and coverage extension, which may provide a more uniform quality of service across communications in the system.

In some examples, a relay device such as a relay UE may enhance throughput or provide extended coverage between a base station 105 and a UE 115. During mmW relaying, a first UE (e.g., UE 115-a) may set up a sidelink connection with a second UE (e.g., UE 115-b) in the network, the sidelink connection between the first UE and the second UE forming a relay link that is at least a portion of a link between the base station 105 and UE 115, and the first UE may communicate with the second UE directly. In some cases, however, the number of candidate relay devices in a network, certain directional transmissions, interference or blockage, power and thermal constraints, regulatory constraints (e.g., maximum permissible exposure (MPE)), and other factors may pose challenges to efficient sidelink connection establishment and communications in the network.

In some examples, a network coverage area 110-a (which may be a cell) may contain a base station 105-a that may communicate with a group of UEs 115. The group of UEs 115 may be a variable number of UEs (e.g., N UEs) located in the cell or coverage area 110-a. In some cases, the number of UEs 115 may be large, for example, in high-traffic settings such as stadiums, indoor offices, shopping malls, downtown settings, etc. Each UE 115 may have multiple antennas and may be configured to support an analog beam codebook of a certain size (e.g., size K, a simplistic assumption of a common sized codebook across all UEs).

In some cases, a UE 115 may determine each UE from the number of UEs to be a suitable candidate, and may perform various beamforming processes in order to establish communications with one of the number of candidate UEs. For example, two or more UEs such as UE 115-a and UE 115-b may set up a sidelink connection using multiple antennas or antenna arrays located at each UE to increase array gain and signal power of the relayed communications. In some examples, UE 115-a may poll a group of UEs to determine a candidate UE with which to establish a sidelink. For example, UE 115-a may conduct a beam sweep 210 to discover candidate UEs within the coverage area 110-a, or within the area enclosing UE subset 205-a. In some cases, the UE 115-a may select a candidate UE with which to establish a sidelink connection (e.g., UE 115-b) and may perform further beam training procedures in order to select a best beam pairing 215.

Some beam scanning and relay selection processes, however, may be overwhelming for the UE 115 due to the large amount of time and resources used to perform discovery and beam training at each antenna array of the UE 115 for each candidate UE. In some other cases, the UE 115 may identify a subset of the potential candidate UEs (e.g., a smaller subset (e.g., group or subgroup) of the total number of UEs in the coverage area, such as UE subsets 205-a, 205-b, and 205-c) with which it may set up a sidelink connection, and may select and refine a candidate beam for communication with one UE from the subset of potential candidate UEs.

A transmitting UE 115-a (e.g., $UE_1$) may use a two-stage approach for relay node discovery, which may reduce the number of resources used in beam selection processes. The transmitting UE 115-a may discover a small subset of the total set of N UEs (e.g., UE subsets 205-a, 205-b, 205-c, etc.) that are located in coverage area 110-a (which may be an example of a service area). The transmitting UE 115-a may then establish a sidelink connection with a candidate relay UE 115-b located in the smaller UE subset 205-a. In such cases, UEs located in the UE subset 205-a may be neighbor UEs located position-wise close to the transmitting UE 115-a and/or may have better average signal strengths than other UEs in the network.

In a first step, the transmitting UE 115-a (e.g., $UE_1$) may discover the UEs 115-b and 115-c located in the smaller UE subset 205-a. In some cases, UE 115-a may use a small subset of beams of beam sweep 210 (e.g., size $K_1$) from a full codebook of beams (e.g., size K) for discovering the set of neighboring UEs. Accordingly, each neighboring UE may be a candidate relay with which UE 115-a may establish a sidelink connection. The small subset of beams $K_1$ that UE 115-a uses to discover neighboring nodes may be significantly smaller than the full codebook K (e.g., $K_1 \ll K$). In addition, the subset of beams $K_1$ may have reduced beamforming array gain, such that 115-a may discover relay UEs with lower latencies (perhaps at shorter link distances). In some wireless communications systems (e.g., mmW systems, sub-6 GHz frequencies, Frequency Range 1 (FR1), etc.) pseudo-omni beams may be used with single antenna transmissions. UE 115-a may use pseudo-omni beams or quasi-omni beams, and may transmit the beams using a uniform or quasi-uniform signal beam pattern over a given spatial coverage area. Each pseudo-omni or quasi-omni beam may have reduced beamforming array gain due to signal energy that is spread over a wider area as compared to directional beams transmitted with higher strength over a narrower area. In one example, the UE 115-a may transmit pseudo-omni beams or quasi-omni beams to cover a wider area to discover position-wise close neighboring UEs 115-b and 115-c within a particular area enclosing UE subset 205-a.

In some cases, the codebook of beams (e.g., K) and the subset of beams (e.g., $K_1$) may be different from those used for downlink beam management including access link discovery (e.g., P1-P2-P3 processes). For example, the full codebook of beams and the subset of beams that UE 115-a may use to discover and establish relay communications may be different from the beams used in beam management with base station 105-a.

In a second step, UE 115-a may perform beam scanning and beam training processes (e.g., similar to P1-P2-P3 beam management processes) with the determined neighbor set of UEs 115-b and 115-c. Such beam scanning and beam training processes may include those described with reference to FIG. 3 and FIG. 4. The neighboring UE subset 205-a (including UE 115-a) may have size M, which in some cases may be variable, and significantly smaller than the total number of UEs in the network (e.g., M<<N). For example, 115-a may use training reference signals configured by base station 105-a to transmit to each of the candidate UEs individually in the UE subset 205-a. In some cases, UE 115-a may use each of the M UEs in the neighboring UE subset 205-a to perform beam scanning processes using a full codebook of beams. In some other cases, UE 115-a may exclude some subset of the UEs (e.g., based on privacy and/or security considerations, UE/OEM type, UE id, etc.).

A dedicated receive (Rx) symbol may be used for each UE, and the total number of symbols spent in beam training may be $K_1^2N(N-1)+K^2M(M-1)$. For transmission as well as reception, each UE of the set of M UEs may be active over $K_1^2(N-1)+K^2(M-1)$ symbols.

In another example, each of the neighboring UEs 115-b and 115-c may listen for and receive the beamformed signals transmitted by UE 115-a. In such examples, the number of resources (e.g., symbols or slots or subframes) used for beam scanning with the neighboring UEs may be less than the resources used for beam scanning with the total set of N UEs located in coverage area 110-a. As a result, UEs within the neighboring UE subset 205-a may use a full codebook K of beams for beam training. In such examples, a common Rx symbols may be used for all UEs, and the total number of symbols spent in beam training may be $K_1^2N+K^2M$. For transmission, there may be $K_1^2+K^2$ symbols active per UE, and for reception there may be $K_1^2(N-1)+K^2(M-1)$ symbols active per UE.

In some other cases, the number of UEs 115 (e.g., N UEs) located in the coverage area 110-a may be configured to transmit simultaneously, in order to reduce beam training latency. Such simultaneous transmissions, however, may increase the amount of interference in the network. As a result, each UE 115 that transmits simultaneously may be configured with a unique identifier, such as a waveform or configured waveform parameters that each UE may use to identify itself for discovery processes. Waveform parameters (e.g., SSB, SRS, CSI-RS, etc.) may in some cases be configured by base station 105-a and assigned to the different UEs 115 located in the coverage area 110-a.

In addition, base station 105-a may determine to reuse assigned waveform parameters in cases where the UEs 115 are located far away from one another. For example, in cases where base station 105-a serves a large number of UEs (e.g., high traffic density), and/or serves a geographically large cell area, the base station 105-a may identify a number of clusters or subsets of spatially close UEs (e.g., by detecting position signaling, associated RSSI/RSRP, etc.), including UE subsets 205-a, 205-b, and 205-c. The base station 105-a may assign waveform parameters within each cluster of UEs, and may determine whether to reuse waveform parameters between different clusters of UEs.

For example, the base station 105-a may determine that two clusters of UEs are position-wise close (e.g., clusters or areas enclosing UE subsets 205-a and 205-b), such that the base station 105-a may not reuse waveform parameters within the clusters of UE subsets 205-a and 205-b, but may instead assign different waveform parameters to the UEs in order to minimize interference. The base station 105-a may identify a different cluster (e.g., cluster including UE subset 205-c) that is far away from either of the first two clusters, so any UE located in the different cluster may reuse either waveform parameter set used by any UE in either of the first two clusters.

Figure 3:
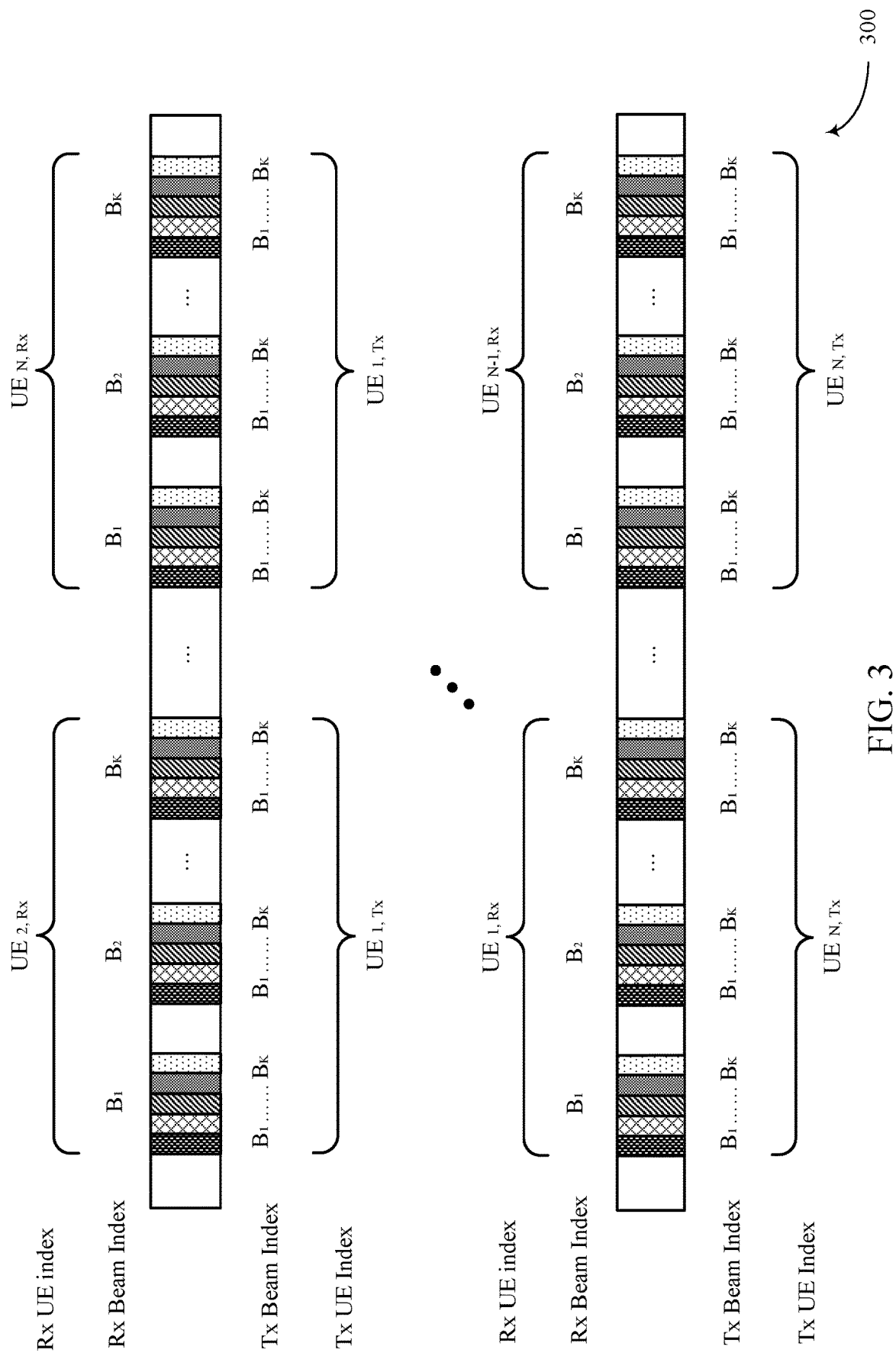
FIG. 3 illustrates an example of a beam scanning procedure that supports methods for beam management in millimeter wave relays in accordance with aspects of the present disclosure.

FIG. 3 illustrates an example of a beam scanning procedure 300 that supports methods for beam management in millimeter wave relays in accordance with aspects of the present disclosure. In some examples, beam scanning procedure 300 may implement aspects of wireless communications system 100. Aspects of beam scanning procedure 300 may be implemented by a transmitting and a receiving device, which may be examples of a base station 105 and/or a UE 115 as described herein. Generally, the beam scanning procedure 300 may be used to establish communication links between the transmitting and receiving devices within wireless communications system 100.

Some wireless networks typically rely on beam management procedures to monitor the performance of active beams and identify candidate beams that can be utilized in relay communications between devices in the network. Conventionally, a transmitting device (e.g., a base station and/or a UE) may establish communications with a receiving device (e.g., a different base station and/or UE) using various methods. A UE which receives signals from a transmitting UE or base station may measure the receive signal levels using one or more receive beams for each transmit beam. The candidate UE may then transmit a beam measure report to the transmitting UE or base station that identifies the defined number of best beams, along with their corresponding measured received signal levels (e.g., gain or reference signal received power (RSRP) levels). The transmitting UE may use this information when selecting the active beam for continued communications with one of the candidate UEs.

In one example, a base station may configure or otherwise set up beam training reference signals (RSs) between the UE and each candidate relay UE in the subgroup of UEs. In some cases, the base station may perform a beam sweeping procedure in a coverage area, and a UE may select a beam and report the selected beam to the base station. The base station may then refine the beam, for example, by performing an additional beam sweeping procedure with finer beams. The UE may then select a refined beam to report to the base station. After beam selection, the base station may transmit the selected beam repeatedly and the UE may refine a receive beam. In some examples, the UE may set a spatial filter on a corresponding receiving antenna array, or may otherwise adapt its receiver to receive the transmitted beam.

A base station may set up beam training reference signals (RSs) for each of the number of candidate UEs in the cell, and the transmitting UE may use the RSs to transmit to each of the candidate UEs individually. In such cases, the transmitting UE may transmit to a single candidate UE while the single candidate UE listens for and/or receives the signals from the transmitting UE. Accordingly, the total number of symbols spent in beam training may be $=K^2N(N-1)$ for such processes where the transmitting UE transmits to a single candidate UE. For example, a UE may spend a total of $K^2(N-1)$ symbols in beam training for transmitting, and a total of $K^2(N-1)$ for receiving.

In a first example, a transmitting UE (e.g., $UE_{1,\ Tx}$) may identify a number or group of candidate N UEs (e.g., $UE_{2,\ Rx}$ through $UE_{N,\ Rx}$) within a cell. For example, the group of UEs (e.g., $UE_{2,\ Rx}$ through $UE_{N,\ Rx}$) may be a subset of the total set UEs of the cell, for example the group determined according to a procedure as described herein. The transmitting UE may then transmit beamformed signals according to a beam codebook of size K using an associated antenna or antenna array. In some examples, the transmitting UE may transmit beams corresponding to transmit beam indices $B_1$ through $B_K$. The receiving UE may then receive each transmitted beam from the beam codebook using a receive beam (e.g., beams corresponding to Rx beam indices $B_1, B_2$, through $B_K$). In such cases, the transmitting UE (e.g., $UE_{1,\ Tx}$) may transmit each beam in the beam codebook of size K to each receiving UE individually, such that $UE_1$ transmits beams to $UE_2$, and $UE_2$ listens using corresponding receive beams. The transmitting UE may continue this process until it has transmitted to each UE in the group of UEs (e.g., through $UE_{N,\ Rx}$).

After transmitting to each of the candidate UEs (e.g., $UE_{2,\ Rx}$ through $UE_{N,\ Rx}$), a different UE may transmit to each of the candidate UEs while each of the candidate UEs listens. For example, $UE_{N,\ Rx}$ which was receiving beams from $UE_1$ may become a transmitting UE (e.g., $UE_{N,\ TX}$) and may transmit beams corresponding to transmit beam indices $B_1$ through $B_K$. $UE_{N,\ Tx}$ may transmit to each of the UEs of the N number of UEs (e.g., $UE_1$ through $UE_{N-1}$), where each of the receiving UEs may receive the transmitted beams using corresponding receive beams $B_1, B_2$, through $B_K$.

The beam scanning procedure as shown in FIG. 3 may continue iteratively until each UE in the set of N UEs has transmitted to each of the other UEs in the group, and such that each UE has received signals from each other UE in the group. In some cases, however, when the number of candidate UEs (e.g., N) and/or the number of beams in the analog codebook (e.g., K) are large, certain aspects of candidate UE discovery and beam refinement may be overwhelming in terms of resource utilization (e.g., latency, power consumption, thermal overhead, etc.).

Figure 4:
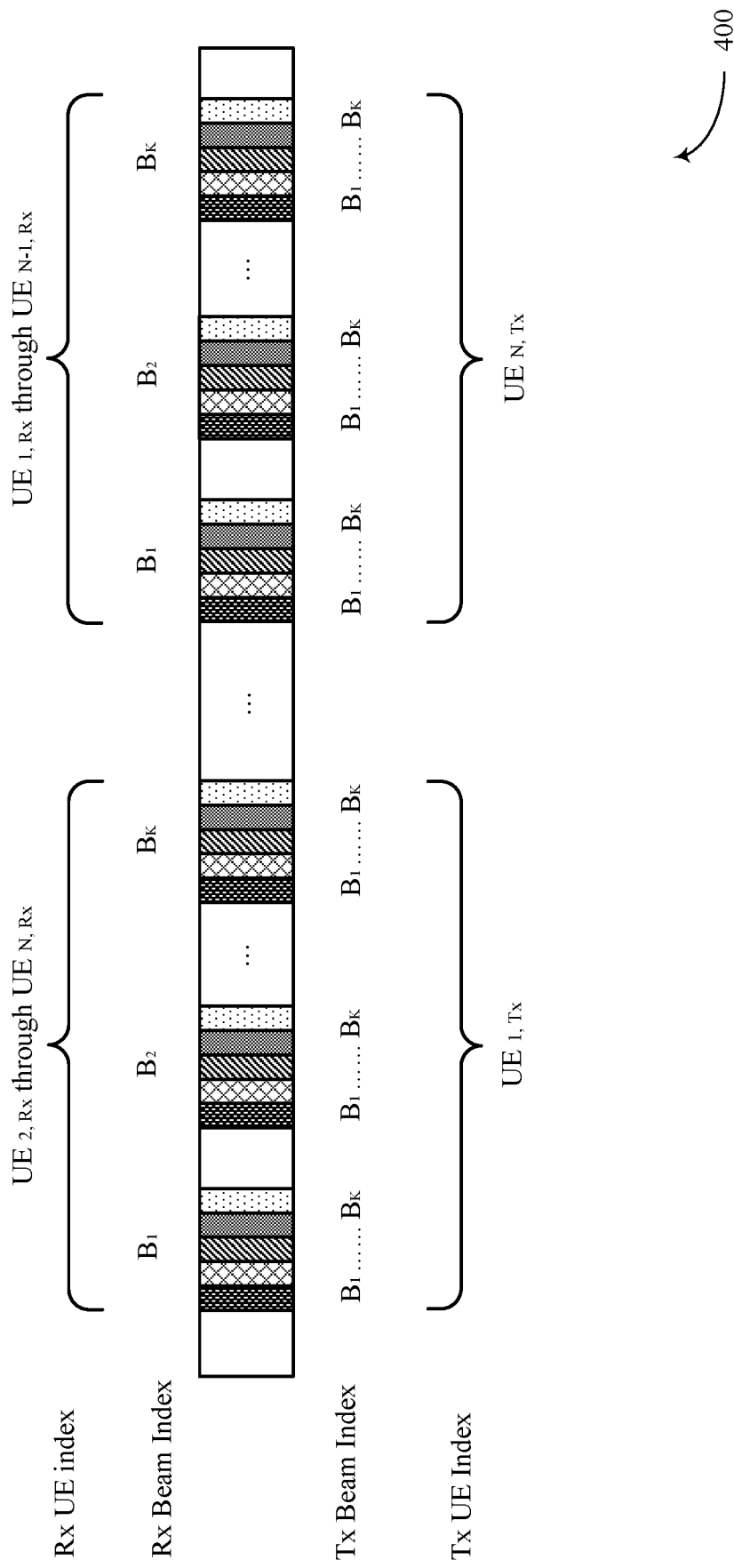
FIG. 4 illustrates an example of a beam scanning procedure that supports methods for beam management in millimeter wave relays in accordance with aspects of the present disclosure.

FIG. 4 illustrates an example of a beam scanning procedure 400 that supports methods for beam management in millimeter wave relays in accordance with aspects of the present disclosure. In some examples, beam scanning procedure 400 may implement aspects of wireless communications system 100. Aspects of beam scanning procedure 400 may be implemented by a transmitting and a receiving device, which may be examples of a base station 105 and/or a UE 115 as described herein. Generally, the beam scanning procedure 400 may be used to establish communication links between the transmitting and receiving devices within wireless communications system 100.

In addition to the beam scanning procedures described with reference to FIG. 3, a transmitting UE may identify a number of candidate UEs (e.g., N UEs). For example, the number of UEs (e.g., $UE_{2,\ Rx}$ through $UE_{N-1,\ Rx}$) may be a subset of the total set UEs of the cell, for example the group determined according to a procedure as described herein. The transmitting UE may transmit beamformed signals in accordance with a full beam codebook in a sweeping manner around a coverage area or cell. In such cases, each of the number of candidate UEs may listen for the beamformed signals while the transmitting UE transmits. In some examples, the beamformed signals may be beam training reference signals (RSs) that may be configured by a base station for each of the number of candidate UEs.

In one example, a first UE (e.g., $UE_{1,\ TX}$) may transmit a number of beams corresponding to the beam indices $B_1$ through $B_K$ associated with a full beam codebook of K beams. A number of receiving UEs (e.g., $UE_{2,\ Rx}$ through $UE_{N,\ Rx}$) from the group of N UEs may listen simultaneously as $UE_{1,\ Tx}$ transmits. $UE_{2,\ Rx}$ through $UE_{N,\ Rx}$ may receive each of the transmitted beams using a number of receive beams (e.g., $B_1, B_2$, through $B_K$).

After $UE_{1,\ Tx}$ transmits to the group of receiving UEs, a next UE (e.g., $UE_{N,\ Tx}$) may transmit a number of beams corresponding to the beam indices $B_1$ through $B_K$ associated with a full beam codebook of K beams. A number of receiving UEs (e.g., including $UE_1$ through $UE_{N-1}$) from the group of N UEs may listen simultaneously as $UE_{N,\ Tx}$ transmits. $UE_1$ through $UE_{N-1}$ may receive each of the transmitted beams using a number of receive beams (e.g., $B_1, B_2$, through $B_K$). In some cases, the total number of symbols spent in beam training may be $K^2N$ for such processes where the transmitting UE transmits to a group of candidate UEs. For example, a UE may spend a total of $K^2$ symbols in beam training for transmitting, and a total of $K^2(N-1)$ for receiving at each UE.

The beam scanning procedure as shown in FIG. 4 may continue iteratively until each UE in the set of N UEs has transmitted to each of the other UEs in the group, and such that each UE has received signals from each other UE in the group. Similar to the procedure described with reference to FIG. 3, however, when the number of candidate UEs (e.g., N) and/or the number of beams in the analog codebook (e.g., K) are large, candidate UE discovery and beam refinement may use a large amount of resources (e.g., latency, power consumption, thermal overhead, etc.).

Figure 5:
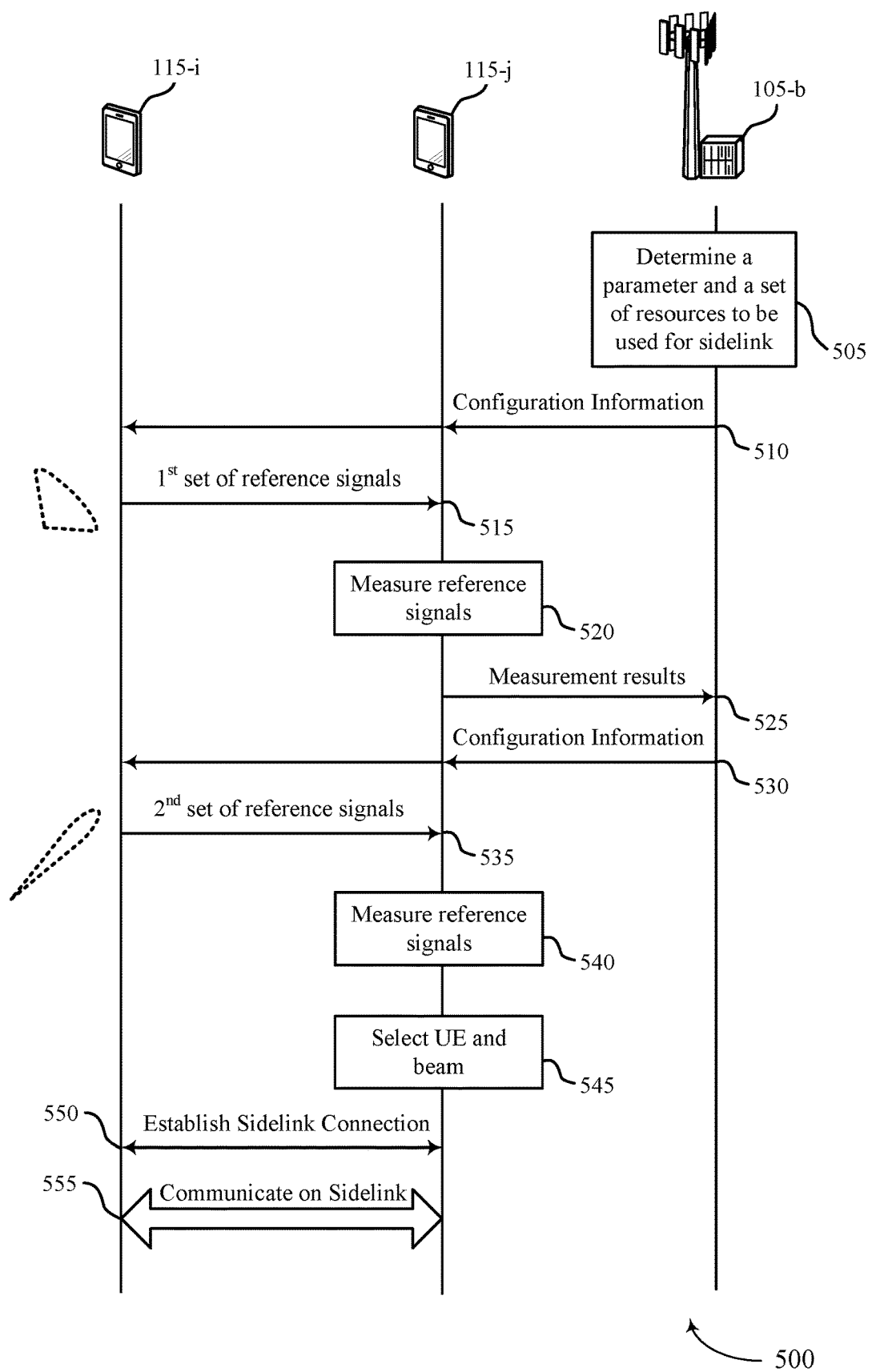
FIG. 5 illustrates an example of a process flow chart that supports methods for beam management in millimeter wave relays in accordance with aspects of the present disclosure.

FIG. 5 illustrates an example of a process flow chart 500 that supports methods for beam management in millimeter wave relays in accordance with aspects of the present disclosure. In some examples, process flow chart 500 may implement aspects of wireless communications system 100.

At 505, base station 105-b may determine, for a set of UEs in the system, a value of at least one parameter and a set of resources for the set of UEs to use to establish sidelink communications. In some cases, the set of UEs may include UE 115-i and UE 115-j. The base station 105-b may determine a set of resources for the UE 115-i, which the UE 115-i may use to transmit reference signals to the set of candidate UEs including UE 115-j. The reference signals may be transmitted on a set of transmit beams. In addition, the set of resources configured by the base station 105-b may include resources that the UE 115-j may use to receive the reference signals transmitted by UE 115-i. The UE 115-j may receive the reference signals using a set of receive beams.

At 510, the base station 105-b may transmit configuration information to the UEs 115-i and 115-j including information for the sidelink establishment procedure. The base station 105-b may serve a number of UEs within the wireless communications network, including UE 115-i, UE 115-j, and a set of candidate UEs for sidelink establishment. In some cases, the base station 105-b may transmit the configuration information to each UE in the system. In some cases, the configuration information may indicate time, frequency, and/or spatial resources for the first set of reference signals, for example time resources (e.g., symbol periods, subframes, slots, mini-slots, or other time periods, or periodicities or other time patterns, etc.), frequency resources (e.g., cells, carriers, subcarriers, resource blocks, etc.), spatial resources (e.g., beams indicated by one or more indices or TCI states), different waveform configurations, or other parameters used by the base station 105-b to transmit the reference signals. In addition, the configuration information may indicate the type of reference signals or other signals to be transmitted and received by the UEs, including UE 115-i and UE 115-j. The type of references signals may include synchronization signal blocks, sounding reference signals, channel state information reference signals, or sidelink discovery reference signals, or a combination of these.

At 515, the UE 115-i may use the first set of resources received from the base station 105-b to transmit a first set of reference signals on a first radio frequency spectrum band (e.g., on a first set of frequency resources of FR1 or FR2) during a sidelink establishment procedure, and the UE 115-j may receive the first set of reference signals. Although shown with UE 115-i transmitting and UE 115-j receiving, each UE of a set of UEs may perform both the transmitting and the receiving at different times during the discovery process, according to the techniques further described herein. The UE 115-i may determine to transmit the first set of reference signals using a first set of transmit beams with a wider coverage area and broad beamwidth. For example, the UE 115-i may transmit the first set of reference signals using pseudo-omnidirectional or quasi-omnidirectional beams that cover a broader spatial area (e.g., broader than an otherwise equivalent directionally beamformed transmission, for example transmitted with a same gain). In some cases, the broader spatial area may correlate with a shorter linear distance from the UE 115-i.

At 520, the UE 115-j may perform measurements of the first set of reference signals transmitted by UE 115-i. For example, the UE 115-j may measure a value associated with the reference signals for reference signal received at UE 115-j that were transmitted by the UE 115-j, such as a RSRP, reference signal received quality (RSRQ), received signal strength indicator, signal to noise ratio, or a signal to interference and noise ratio.

At 525, the UE 115-j may transmit measurement results for the first set of reference signals to the base station 105-b, and the base station 105-b may receive the measurement results. In some cases, the transmitted measurement report may include the measured values, for example of the signal strength or link quality, as well as an indication of a privacy or security parameter associated with the set of candidate UEs, etc.

At 530, the base station 105-b may use measurement results transmitted from the UE 115-j to determine a set of candidate UEs for communication and sidelink establishment processes with the UE 115-i based on the measurement results transmitted from the UE 115-j, and transmit an indication of the set of candidate UEs to UEs 115-i and 115-j. In some cases, the set of candidate UEs may be a subset of the set of UEs in the system of UEs served by the base station 105-b, including UE 115-i and UE 115-j. For example, the base station may select the set of UEs based on a threshold value associated with a measured value reported by the UE 115-j (e.g., a threshold value of a RSRP, RSRQ, received signal strength indicator, signal to noise ratio, or a signal to interference and noise ratio. Although discussed with reference to one such set of candidate UEs, the base station 105-b may receive measurements from multiple UEs, and group UEs into multiple different sets of candidate UEs.

At 530, the base station 105-b may also determine configuration information for the subset of UEs for establishing a sidelink connection, and may transmit the configuration information to the set of UEs. The configuration information may indicate time, frequency, and/or spatial resources a second set of reference signals, for example time resources (e.g., symbol periods, subframes, slots, mini-slots, or other time periods, or periodicities or other time patterns, etc.), frequency resources (e.g., cells, carriers, subcarriers, resource blocks, etc.), spatial resources (e.g., beams indicated by one or more indices or TCI states), different waveform configurations, or other parameters. The configuration information may indicate reference signals that are or are a part of synchronization signal blocks, sounding reference signals, channel state information reference signals, or sidelink discovery reference signals, or a combination thereof.

At 535, the UE 115-i may transmit, to the subset of candidate UEs including UE 115-j, a second set of reference signals on a second radio frequency spectrum band (e.g., on frequency resources of FR2) using a second set of transmit beams during the sidelink establishment procedure. The transmission may be according to the received configuration information of 530. UE 115-j may receive the second set of reference signals on the second set of transmit beams. Each transmit beam used to transmit the first set of reference signals may be broader in beamwidth (e.g., omni-directional or wider beamwidth) and may have lower array gain than each transmit beam used to transmit the second set of reference signals, which may be narrower transmit beams (e.g., narrower beamwidth than the broader beams for the first set of reference signals transmitted by UE 115-i in 515). In some cases, the lower array gain may be or indicate a lower received signal strength indicator, a lower reference signal received power, a lower reference signal received quality, a lower signal to noise ratio, or a lower signal to interference and noise ratio, or a combination thereof.

At 540, the UE 115-j may perform measurements of the second set of reference signals transmitted by UE 115-i. For example, the UE 115-j may measure link quality for each of the second set of reference signals. In addition, the UE 115-j may transmit measurement results to the base station 105-b, and the base station 105-b may receive the measurement results. In some cases, the UE 115-j may transmit a measurement report to the base station 105-b which may include the measured values, for example of the signal strength or link quality, as well as an indication of a privacy or security parameter associated with the set of candidate UEs, etc.

At 545, the UE 115-j may use the measurement results to determine a candidate UE and candidate beam for sidelink communication. For example, UE 115-j may determine to establish a sidelink connection with UE 115-i, and may determine a beam with which to communicate based on the measurement of the second set of reference signals transmitted by the UE 115-i. In some cases, UE 115-j may select a beam from UE 115-i based on a threshold reported reference signal quality. Additionally or alternatively, the base station may select UE 115-i for sidelink communications with UE 115-j, and may notify the UE 115-j of the selection.

In some cases, the UE 115-j may select UE 115-i from the subset of candidate UEs based on the transmitted second set of reference signals. In some cases, UE 115-i may transmit a third set of reference signals on a narrower beamwidth set of transmit beams than the transmit beams used to transmit the second set of reference signals (e.g., narrower than the otherwise equivalent directionally beamformed transmission of the second set of reference signals).

At 555, the UE 115-i and UE 115-j may establish the sidelink connection using the selected transmit beam and the selected receive beam.

At 560, the UE 115-i and UE 115-j may communicate using the established sidelink connection.

Figure 6:
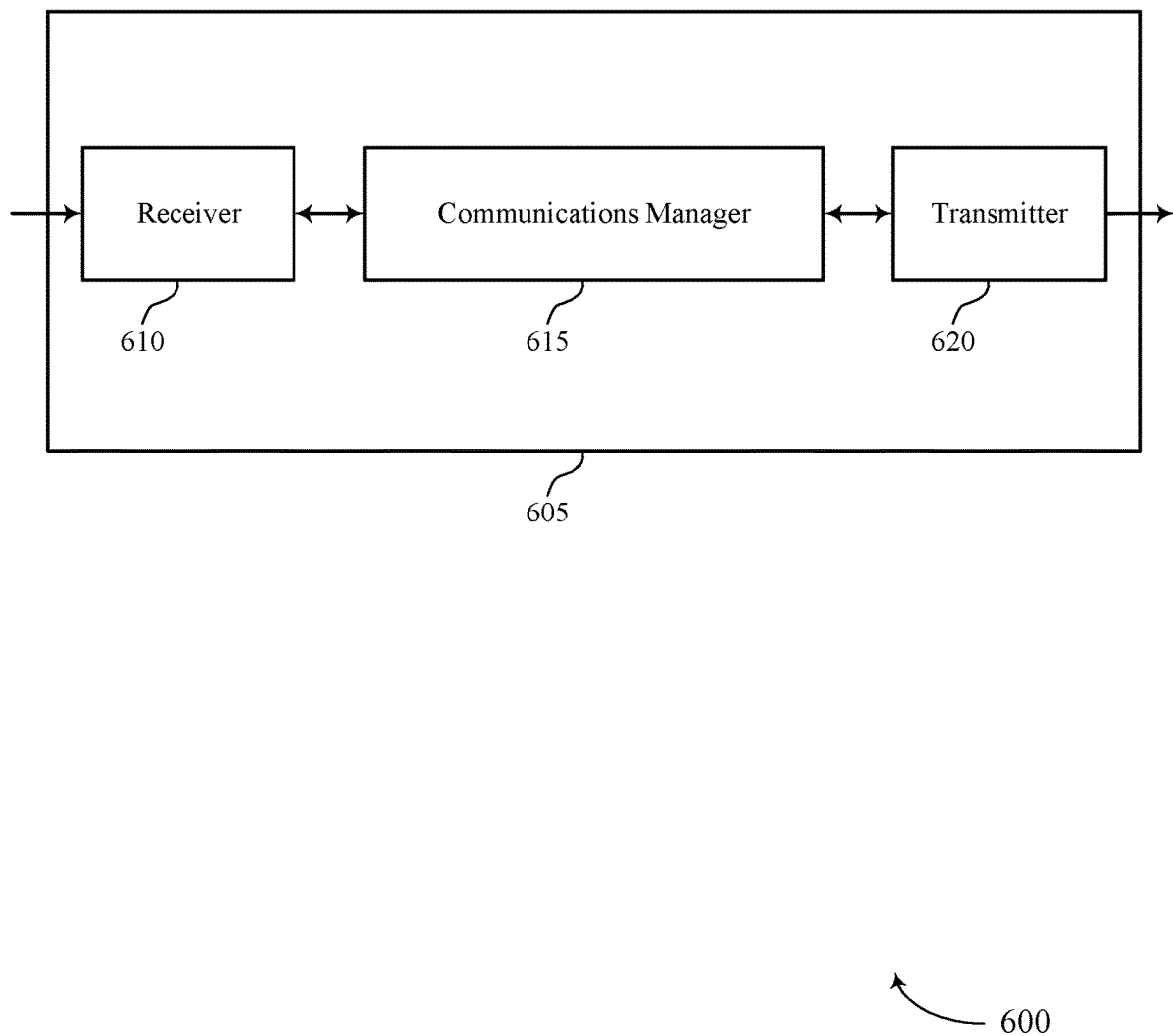
FIGS. 6 and 7 show block diagrams of devices that support methods for beam management in millimeter wave relays in accordance with aspects of the present disclosure.

FIG. 6 shows a block diagram 600 of a device 605 that supports methods for beam management in millimeter wave relays in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to methods for beam management in millimeter wave relays, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first set of reference signals during a sidelink establishment procedure, receive, for the determined set of candidate UEs, a second set of reference signals on a set of receive beams during the sidelink establishment procedure, determine a set of candidate UEs based on a measurement of the received first set of reference signals, select, based on the received second set of reference signals, a second UE of the determined set of candidate UEs and a receive beam associated with the second UE, and establish a sidelink connection with the second UE using the at least one receive beam. The communications manager 615 may also transmit a first set of reference signals during a sidelink establishment procedure, transmit, for the determined set of candidate UEs, a second set of reference signals on a set of transmit beams during the sidelink establishment procedure, determine, at least in part in response to the transmitted first set of reference signals, a set of candidate UEs for a sidelink connection, the set of candidate UEs a subset of a set of UEs served by a base station, and establish, with a first UE, the sidelink connection at least in part in response to the transmitted second set of reference signals. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may reduce the number of resources used in communications (e.g., sidelink establishment) between a UE and various other devices within the network. At least one implementation may enable the communications manager 615 to effectively reduce the latency of communications, as the procedures described herein may reduce the amount of time used to establish a sidelink between devices. At least one implementation may enable communications manager 615 to reduce interference by identifying different clusters of UEs and using different resource sets based on spatial considerations.

Based on implementing the beam management techniques as described herein, one or more processors of the device 605 (e.g., processor(s) controlling or incorporated with one or more of receiver 610, communications manager 615, and transmitter 620) may reduce an amount of time required to effectively establish a sidelink, which may increase communications efficiency and quality within the network.

Figure 7:
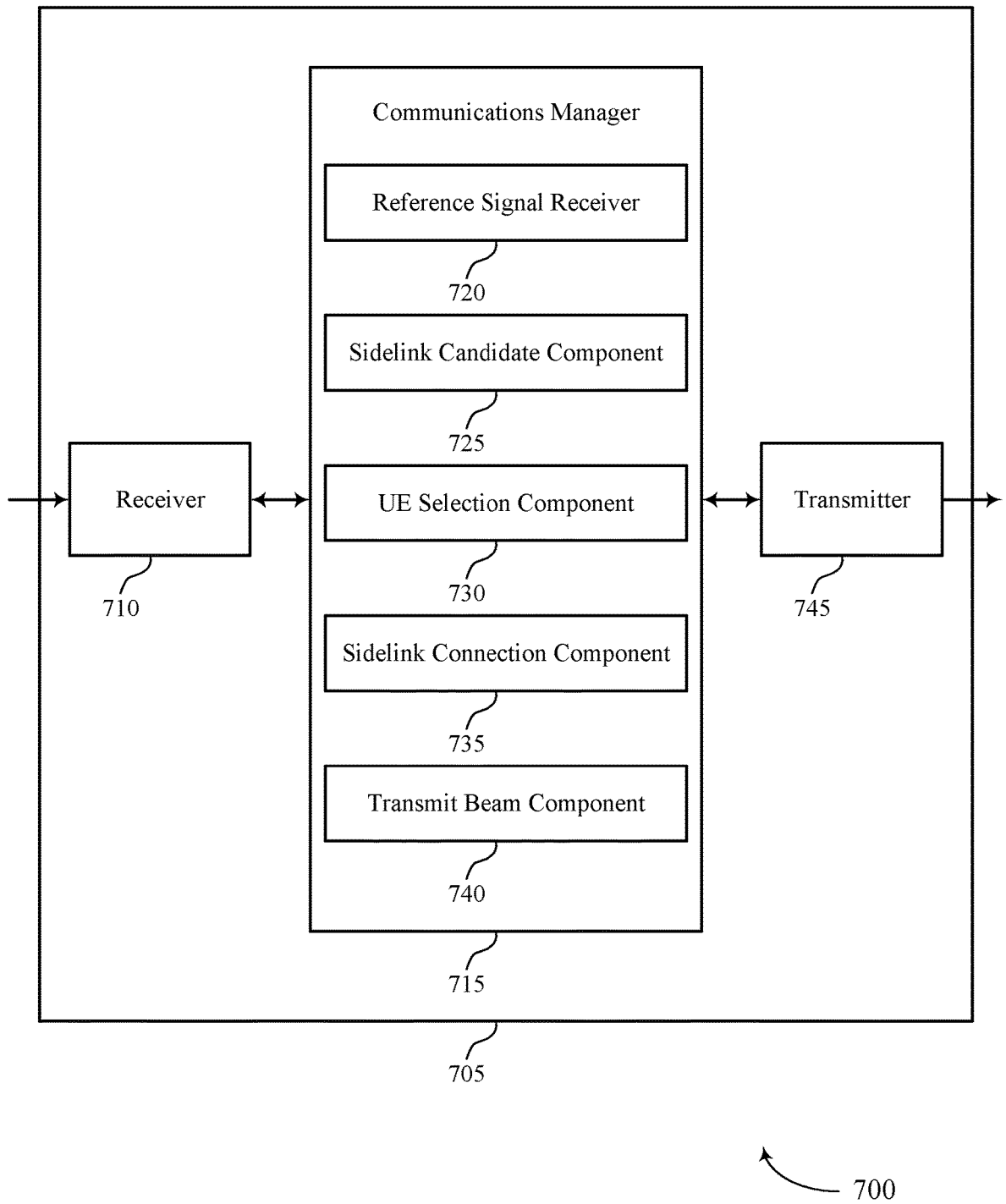

FIG. 7 shows a block diagram 700 of a device 705 that supports methods for beam management in millimeter wave relays in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to methods for beam management in millimeter wave relays, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reference signal receiver 720, a sidelink candidate component 725, an UE selection component 730, a sidelink connection component 735, and a transmit beam component 740. The communications manager 715 may be an example of aspects of the communications manager 910 described herein.

The reference signal receiver 720 may receive a first set of reference signals during a sidelink establishment procedure and receive, for the determined set of candidate UEs, a second set of reference signals on a set of receive beams during the sidelink establishment procedure.

The transmit beam component 740 may transmit a first set of reference signals during a sidelink establishment procedure and transmit, for the determined set of candidate UEs, a second set of reference signals on a set of transmit beams during the sidelink establishment procedure.

The sidelink candidate component 725 may determine a set of candidate UEs based on a measurement of the received first set of reference signals. The UE selection component 730 may determine, at least in part in response to the transmitted first set of reference signals, a set of candidate UEs for a sidelink connection, the set of candidate UEs a subset of a set of UEs served by a base station.

The UE selection component 730 may select, based on the received second set of reference signals, a second UE of the determined set of candidate UEs and a receive beam associated with the second UE.

The sidelink connection component 735 may establish a sidelink connection with the second UE using the at least one receive beam. The sidelink connection component 735 may establish, with a first UE, the sidelink connection at least in part in response to the transmitted second set of reference signals.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
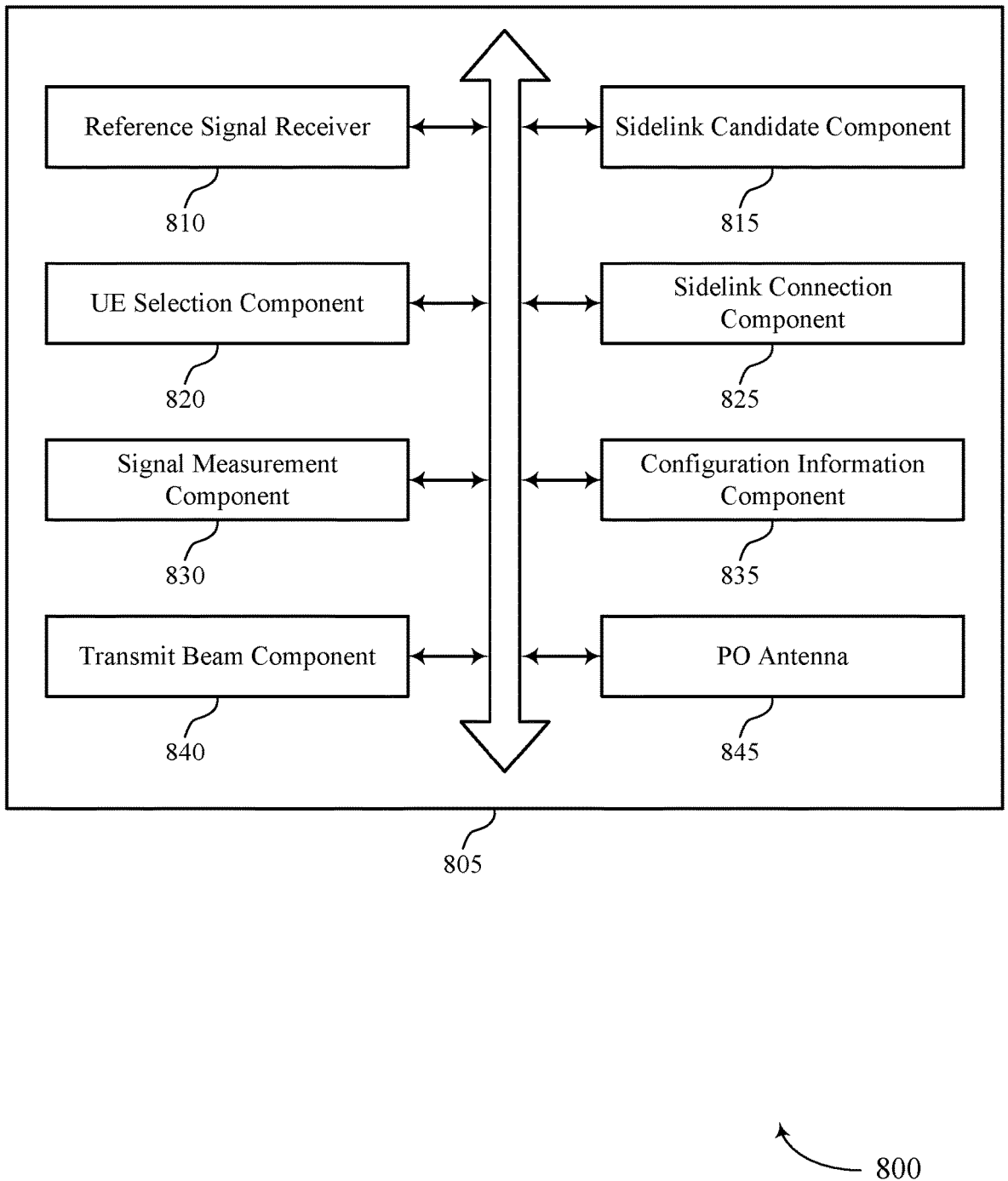
FIG. 8 shows a block diagram of a communications manager that supports methods for beam management in millimeter wave relays in accordance with aspects of the present disclosure.

FIG. 8 shows a block diagram 800 of a communications manager 805 that supports methods for beam management in millimeter wave relays in accordance with aspects of the present disclosure. The communications manager 805 may be an example of aspects of a communications manager 615, a communications manager 715, or a communications manager 910 described herein. The communications manager 805 may include a reference signal receiver 810, a sidelink candidate component 815, an UE selection component 820, a sidelink connection component 825, a signal measurement component 830, a configuration information component 835, a transmit beam component 840, and a PO antenna 845. Each of these modules may communicate, directly or indirectly, with one another (e.g., via one or more buses).

The transmit beam component 840 may transmit a first set of reference signals during a sidelink establishment procedure.

The reference signal receiver 810 may receive a first set of reference signals during a sidelink establishment procedure. In some examples, the reference signal receiver 810 may receive, for the determined set of candidate UEs, a second set of reference signals on a set of receive beams during the sidelink establishment procedure. In some cases, the first set of reference signals are received in a first radio frequency spectrum band.

The signal measurement component 830 may measure, for each reference signal of the first set of reference signals, a value of a parameter for the reference signal. In some examples, the signal measurement component 830 may transmit the measured values to a base station. In some examples, the signal measurement component 830 may measure, for each reference signal of the first set of reference signals, a value of a parameter for the reference signal.

In some examples, the transmit beam component 840 may transmit, for the determined set of candidate UEs, a second set of reference signals on a set of transmit beams during the sidelink establishment procedure.

In some cases, each receive beam of a set of receive beams used to receive the first set of reference signals is broader in beamwidth than each receive beam of the set of receive beams used to receive the second set of reference signals. In some cases, the second set of reference signals are received in a second radio frequency spectrum band different than the first radio frequency spectrum band.

In some cases, each receive beam of a set of receive beams used to receive the first set of reference signals has a lower array gain than each receive beam of the set of receive beams used to receive the second set of reference signals, where having the lower array gain includes having a lower received signal strength indicator, a lower reference signal received power, a lower reference signal received quality, a lower signal to noise ratio, or a lower signal to interference and noise ratio, or a combination thereof.

The sidelink candidate component 815 may determine a set of candidate UEs based on a measurement of the received first set of reference signals.

In some examples, the UE selection component 820 may determine, by the first UE, the set of candidate UEs based on the measured values. In some examples, the UE selection component 820 may receive, from the base station, an indication of the set of candidate UEs. In some examples, the UE selection component 820 may determine, at least in part in response to the transmitted first set of reference signals, a set of candidate UEs for a sidelink connection, the set of candidate UEs a subset of a set of UEs served by a base station. The UE selection component 820 may select, based on the received second set of reference signals, a second UE of the determined set of candidate UEs and a receive beam associated with the second UE. In some cases, the set of candidate UEs for the sidelink connection is determined further based on a privacy or security parameter associated with the set of candidate UEs.

The sidelink connection component 825 may establish a sidelink connection with the second UE using the at least one receive beam. In some examples, the sidelink connection component 825 may establish, with a first UE, the sidelink connection at least in part in response to the transmitted second set of reference signals.

The PO antenna 845 may transmit the first set of reference signals using pseudo- or quasi-omnidirectional beams that target and cover a broader spatial area. In some cases, each transmit beam of a set of transmit beams used to transmit the first set of reference signals is broader in beamwidth than each transmit beam of the set of transmit beams used to transmit the second set of reference signals.

In some cases, each transmit beam of a set of transmit beams used to transmit the first set of reference signals has a lower array gain than each transmit beam of the set of transmit beams used to transmit the second set of reference signals, where having the lower array gain includes having a lower received signal strength indicator, a lower reference signal received power, a lower reference signal received quality, a lower signal to noise ratio, or a lower signal to interference and noise ratio, or a combination thereof.

The configuration information component 835 may receive configuration information for the sidelink establishment procedure from a base station serving a set of UEs, including the first UE and the set of candidate UEs.

In some cases, the configuration information indicates time-frequency resources for the first set of reference signals, where the first set of reference signals include synchronization signal blocks, sounding reference signals, channel state information reference signals, or sidelink discovery reference signals, or a combination thereof.

In some examples, the transmit beam component 840 may transmit a third set of reference signals on a narrower beamwidth set of transmit beams than the transmit beams of the set of transmit beams used to transmit the second set of reference signals. In some examples, the transmit beam component 840 may select the transmit beam from the narrower beamwidth set of transmit beams.

In some examples, the reference signal receiver 810 may receive a third set of reference signals on a narrower beamwidth set of receive beams than the receive beams of the set of receive beams used to receive the second set of reference signals. In some examples, the reference signal receiver 810 may select the receive beam from the narrower beamwidth set of receive beams.

Figure 9:
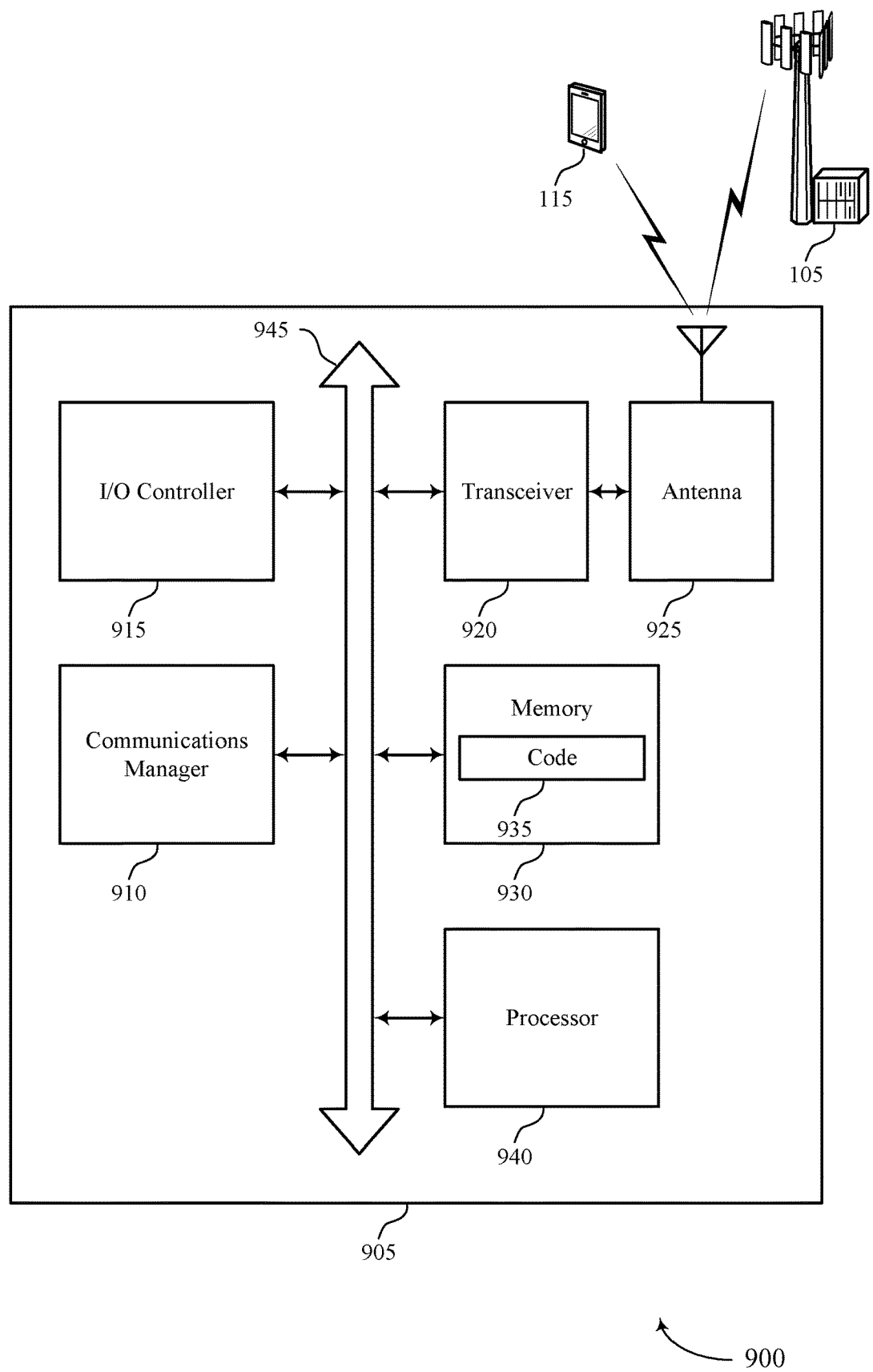
FIG. 9 shows a diagram of a system including a device that supports methods for beam management in millimeter wave relays in accordance with aspects of the present disclosure.

FIG. 9 shows a diagram of a system 900 including a device 905 that supports methods for beam management in millimeter wave relays in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first set of reference signals during a sidelink establishment procedure, receive, for the determined set of candidate UEs, a second set of reference signals on a set of receive beams during the sidelink establishment procedure, determine a set of candidate UEs based on a measurement of the received first set of reference signals, select, based on the received second set of reference signals, a second UE of the determined set of candidate UEs and a receive beam associated with the second UE, and establish a sidelink connection with the second UE using the at least one receive beam. The communications manager 910 may also transmit a first set of reference signals during a sidelink establishment procedure, transmit, for the determined set of candidate UEs, a second set of reference signals on a set of transmit beams during the sidelink establishment procedure, determine, at least in part in response to the transmitted first set of reference signals, a set of candidate UEs for a sidelink connection, the set of candidate UEs a subset of a set of UEs served by a base station, and establish, with a first UE, the sidelink connection at least in part in response to the transmitted second set of reference signals.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting methods for beam management in millimeter wave relays).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
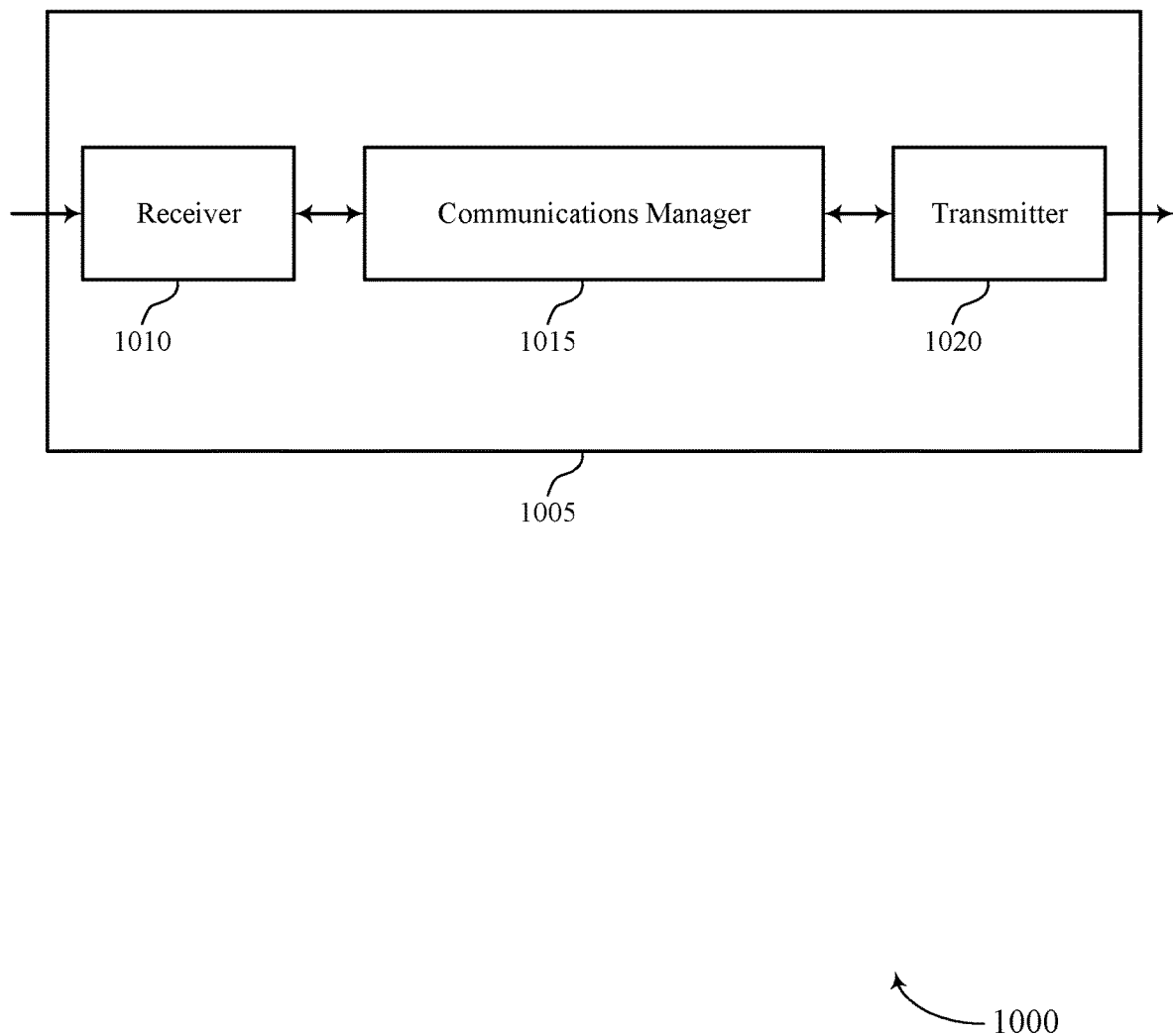
FIGS. 10 and 11 show block diagrams of devices that support methods for beam management in millimeter wave relays in accordance with aspects of the present disclosure.

FIG. 10 shows a block diagram 1000 of a device 1005 that supports methods for beam management in millimeter wave relays in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to methods for beam management in millimeter wave relays, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine, for a first UE of a set of UEs served by the base station, a value of at least one parameter for the first UE to use to identify, during a sidelink establishment procedure, a set of candidate UEs for a sidelink connection, determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection, and transmit, to the UE, configuration information indicating the value of the at least one parameter and the determined set of resources. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
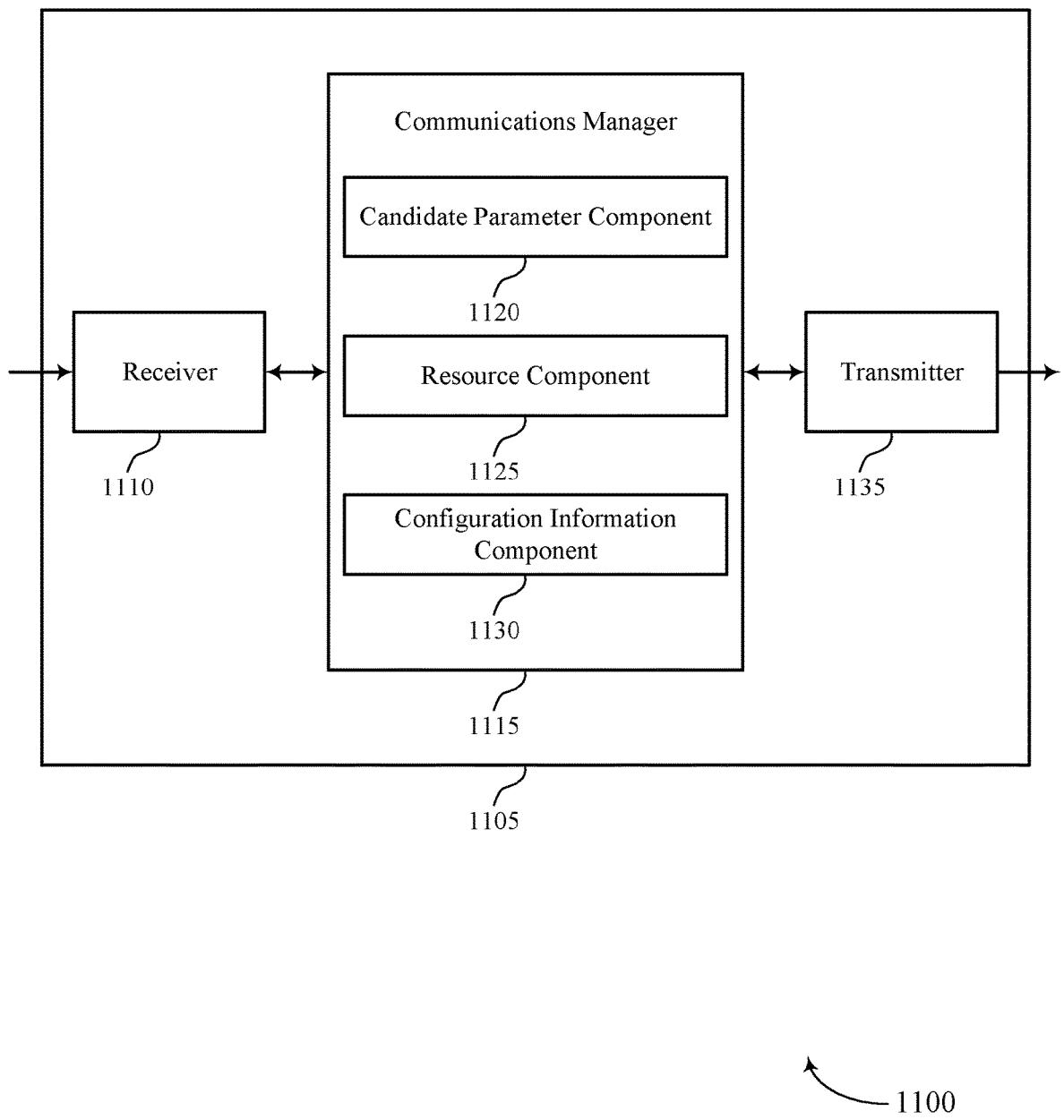

FIG. 11 shows a block diagram 1100 of a device 1105 that supports methods for beam management in millimeter wave relays in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to methods for beam management in millimeter wave relays, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a candidate parameter component 1120, a resource component 1125, and a configuration information component 1130. The communications manager 1115 may be an example of aspects of the communications manager 1310 described herein.

The candidate parameter component 1120 may determine, for a first UE of a set of UEs served by the base station, a value of at least one parameter for the first UE to use to identify, during a sidelink establishment procedure, a set of candidate UEs for a sidelink connection.

The resource component 1125 may determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection.

The configuration information component 1130 may transmit, to the UE, configuration information indicating the value of the at least one parameter and the determined set of resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
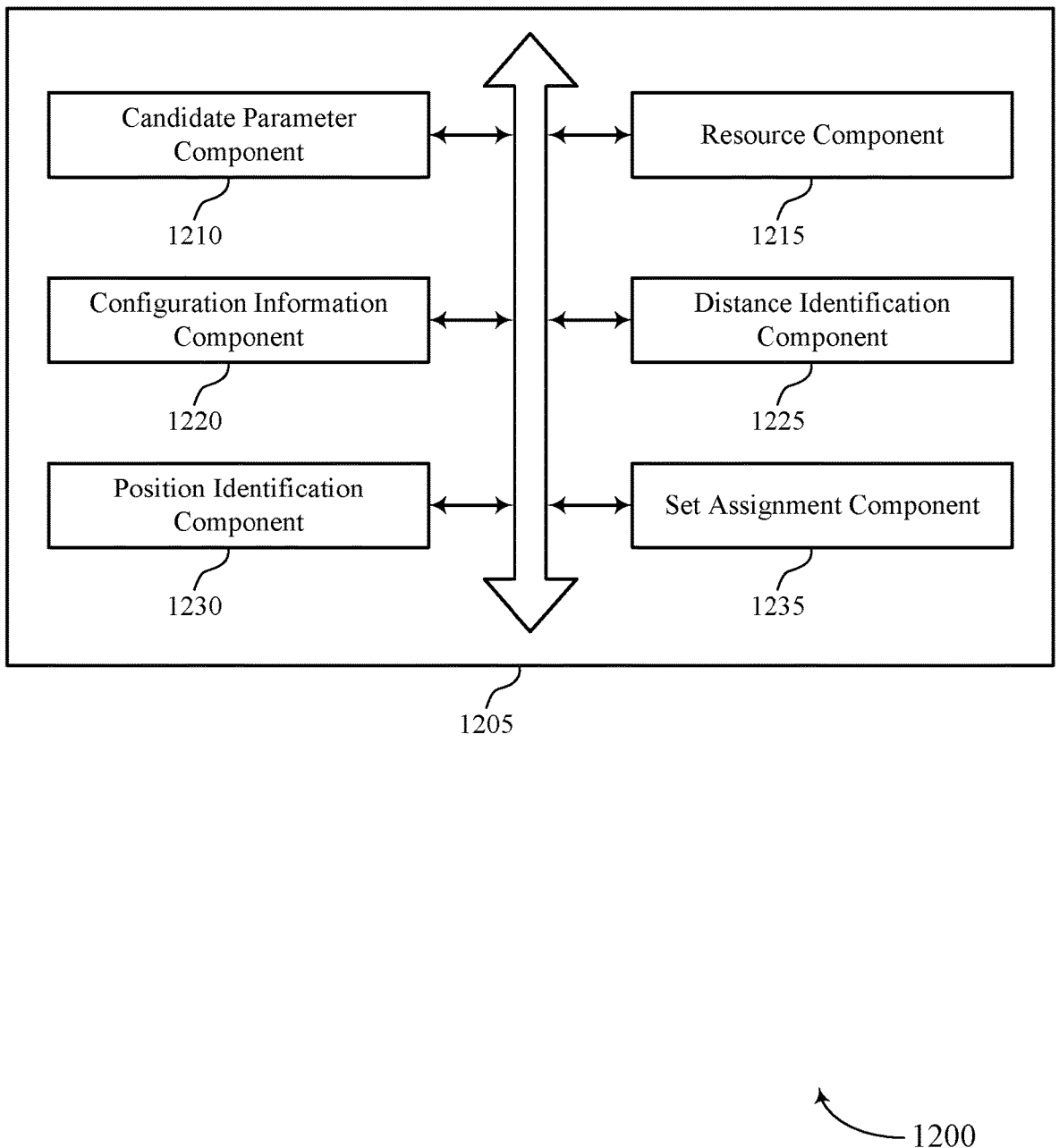
FIG. 12 shows a block diagram of a communications manager that supports methods for beam management in millimeter wave relays in accordance with aspects of the present disclosure.

FIG. 12 shows a block diagram 1200 of a communications manager 1205 that supports methods for beam management in millimeter wave relays in accordance with aspects of the present disclosure. The communications manager 1205 may be an example of aspects of a communications manager 1015, a communications manager 1115, or a communications manager 1310 described herein. The communications manager 1205 may include a candidate parameter component 1210, a resource component 1215, a configuration information component 1220, a distance identification component 1225, a position identification component 1230, and a set assignment component 1235. Each of these modules may communicate, directly or indirectly, with one another (e.g., via one or more buses).

The candidate parameter component 1210 may determine, for a first UE of a set of UEs served by the base station, a value of at least one parameter for the first UE to use to identify, during a sidelink establishment procedure, a set of candidate UEs for a sidelink connection.

The resource component 1215 may determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection.

In some examples, the resource component 1215 may determine, based on the identifying, a second set of resources for the second set of UEs to use to transmit and receive reference signals during the sidelink establishment procedure, where the set of resources for the first set of UEs is different from the second set of resources for the second set of UEs. In some examples, the resource component 1215 may where the set of resources for the first set of UEs and the second set of resources for the second set of UEs include one or more different waveform parameter values.

The configuration information component 1220 may transmit, to the UE, configuration information indicating the value of the at least one parameter and the determined set of resources.

The distance identification component 1225 may identify that a distance between a first set of UEs of the set of UEs, including the UE, and a second set of UEs of the set of UEs fails to satisfy a threshold distance. In some examples, the distance identification component 1225 may identify that a distance between a first set of UEs of the set of UEs, including the UE, and a second set of UEs of the set of UEs satisfies a threshold distance.

The position identification component 1230 may determine a first position of one or more UEs of the first set of UEs and a second position of one or more UEs of the second set of UEs, where the distance between the first position and the second position fails to satisfy the threshold distance. In some examples, the position identification component 1230 may determine, for each UE of the set of UEs, a position of the UE.

The set assignment component 1235 may assign, for each UE of the set of UEs, the UE to one of the first set of UEs, or the second set of UEs, or a third set of UEs, based on the position of the UE being at least the threshold distance from a reference UE of the set of UEs. In some examples, the set assignment component 1235 may determine, based on the identifying, that the second set of UEs is to use one or more of the set of resources that the first set of UEs is to use to transmit and receive reference signals during the sidelink establishment procedure.

Figure 13:
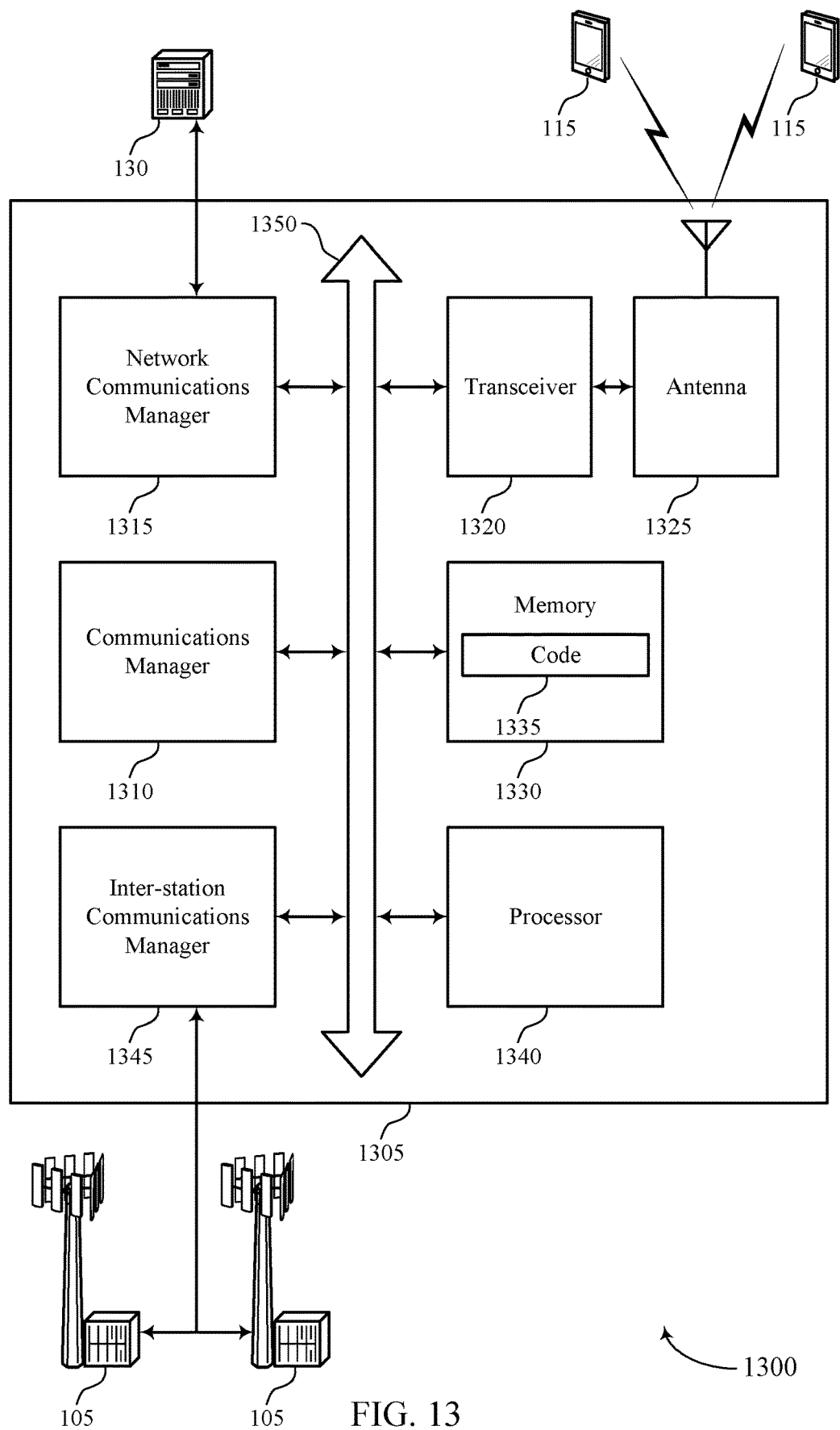
FIG. 13 shows a diagram of a system including a device that supports methods for beam management in millimeter wave relays in accordance with aspects of the present disclosure.

FIG. 13 shows a diagram of a system 1300 including a device 1305 that supports methods for beam management in millimeter wave relays in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine, for a first UE of a set of UEs served by the base station, a value of at least one parameter for the first UE to use to identify, during a sidelink establishment procedure, a set of candidate UEs for a sidelink connection, determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection, and transmit, to the UE, configuration information indicating the value of the at least one parameter and the determined set of resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting methods for beam management in millimeter wave relays).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
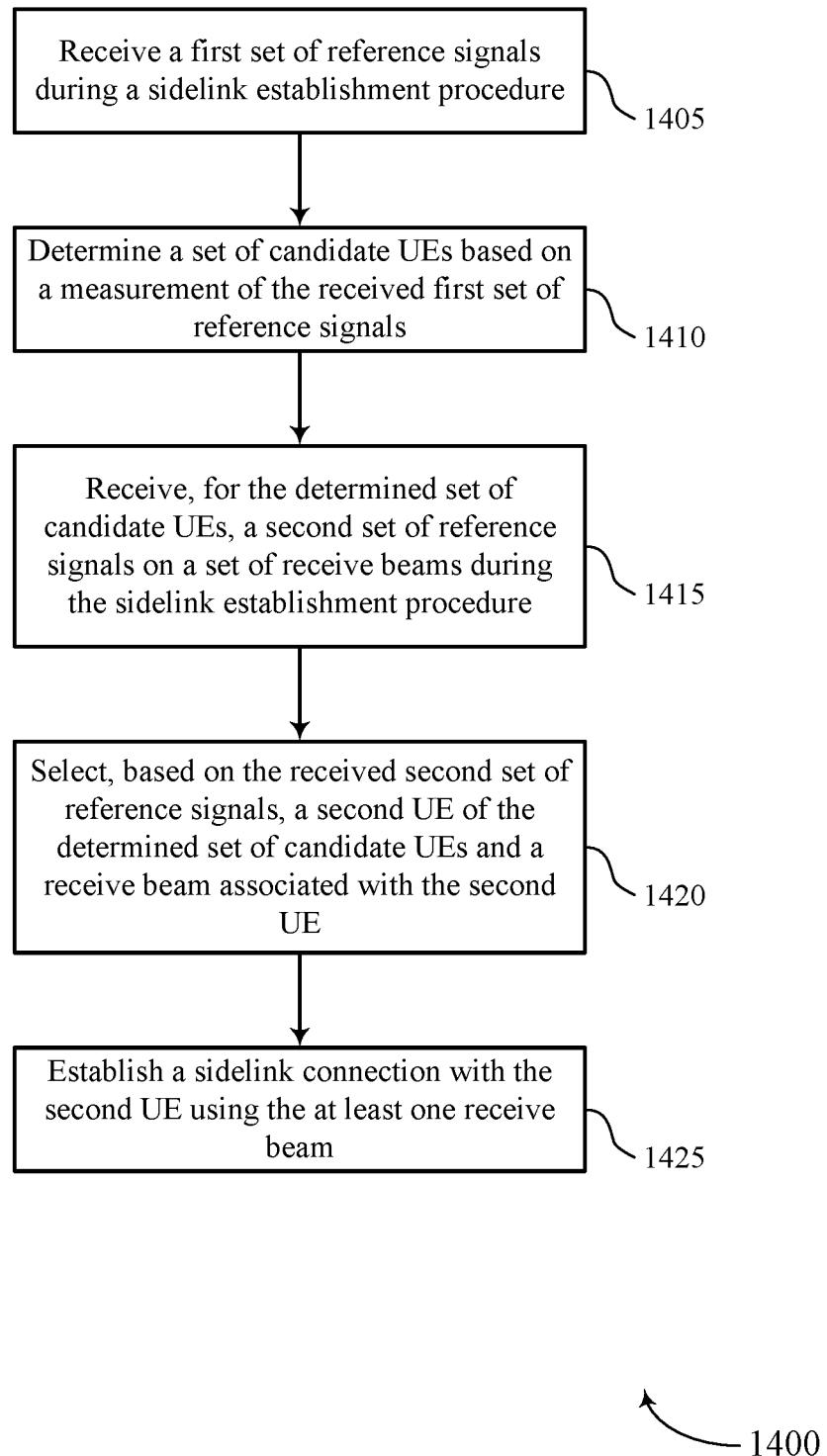
FIGS. 14 through 20 show flowcharts illustrating methods that support methods for beam management in millimeter wave relays in accordance with aspects of the present disclosure.

FIG. 14 shows a flowchart illustrating a method 1400 that supports methods for beam management in millimeter wave relays in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first set of reference signals during a sidelink establishment procedure. The operations of 1405 may be performed according to the methods described herein. In some examples, aspects of the operations of 1405 may be performed by a reference signal receiver as described with reference to FIGS. 6 through 9.

At 1410, the UE may determine a set of candidate UEs based on a measurement of the received first set of reference signals. The operations of 1410 may be performed according to the methods described herein. In some examples, aspects of the operations of 1410 may be performed by a sidelink candidate component as described with reference to FIGS. 6 through 9.

At 1415, the UE may receive, for the determined set of candidate UEs, a second set of reference signals on a set of receive beams during the sidelink establishment procedure. The operations of 1415 may be performed according to the methods described herein. In some examples, aspects of the operations of 1415 may be performed by a reference signal receiver as described with reference to FIGS. 6 through 9.

At 1420, the UE may select, based on the received second set of reference signals, a second UE of the determined set of candidate UEs and a receive beam associated with the second UE. The operations of 1420 may be performed according to the methods described herein. In some examples, aspects of the operations of 1420 may be performed by an UE selection component as described with reference to FIGS. 6 through 9.

At 1425, the UE may establish a sidelink connection with the second UE using the at least one receive beam. The operations of 1425 may be performed according to the methods described herein. In some examples, aspects of the operations of 1425 may be performed by a sidelink connection component as described with reference to FIGS. 6 through 9.

Figure 15:
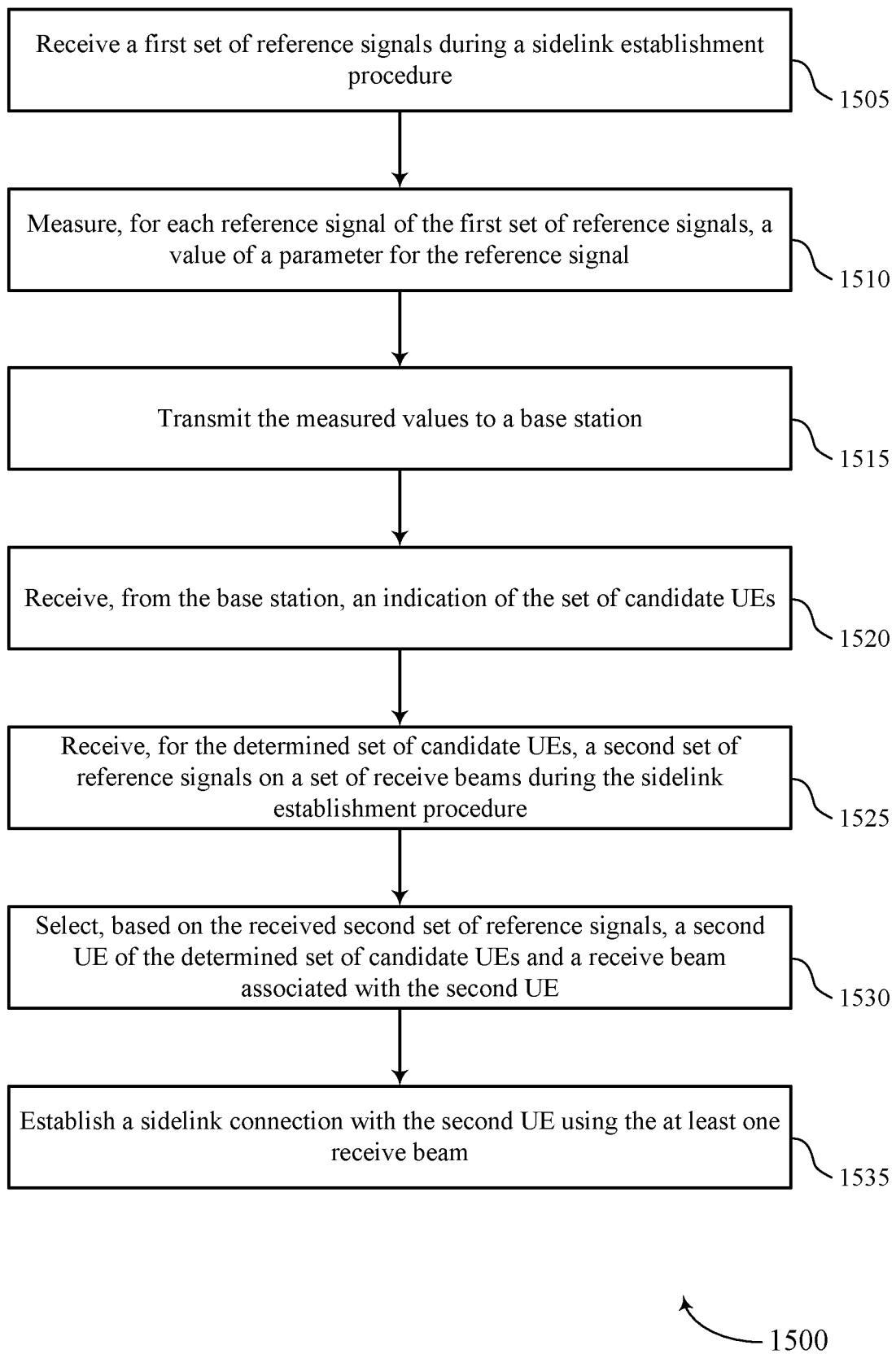

FIG. 15 shows a flowchart illustrating a method 1500 that supports methods for beam management in millimeter wave relays in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first set of reference signals during a sidelink establishment procedure. The operations of 1505 may be performed according to the methods described herein. In some examples, aspects of the operations of 1505 may be performed by a reference signal receiver as described with reference to FIGS. 6 through 9.

At 1510, the UE may measure, for each reference signal of the first set of reference signals, a value of a parameter for the reference signal. The operations of 1510 may be performed according to the methods described herein. In some examples, aspects of the operations of 1510 may be performed by a signal measurement component as described with reference to FIGS. 6 through 9.

At 1515, the UE may transmit the measured values to a base station. The operations of 1515 may be performed according to the methods described herein. In some examples, aspects of the operations of 1515 may be performed by a signal measurement component as described with reference to FIGS. 6 through 9.

At 1520, the UE may receive, from the base station, an indication of the set of candidate UEs. The operations of 1520 may be performed according to the methods described herein. In some examples, aspects of the operations of 1520 may be performed by an UE selection component as described with reference to FIGS. 6 through 9.

At 1525, the UE may receive, for the determined set of candidate UEs, a second set of reference signals on a set of receive beams during the sidelink establishment procedure. The operations of 1525 may be performed according to the methods described herein. In some examples, aspects of the operations of 1525 may be performed by a reference signal receiver as described with reference to FIGS. 6 through 9.

At 1530, the UE may select, based on the received second set of reference signals, a second UE of the determined set of candidate UEs and a receive beam associated with the second UE. The operations of 1530 may be performed according to the methods described herein. In some examples, aspects of the operations of 1530 may be performed by an UE selection component as described with reference to FIGS. 6 through 9.

At 1535, the UE may establish a sidelink connection with the second UE using the at least one receive beam. The operations of 1535 may be performed according to the methods described herein. In some examples, aspects of the operations of 1535 may be performed by a sidelink connection component as described with reference to FIGS. 6 through 9.

Figure 16:
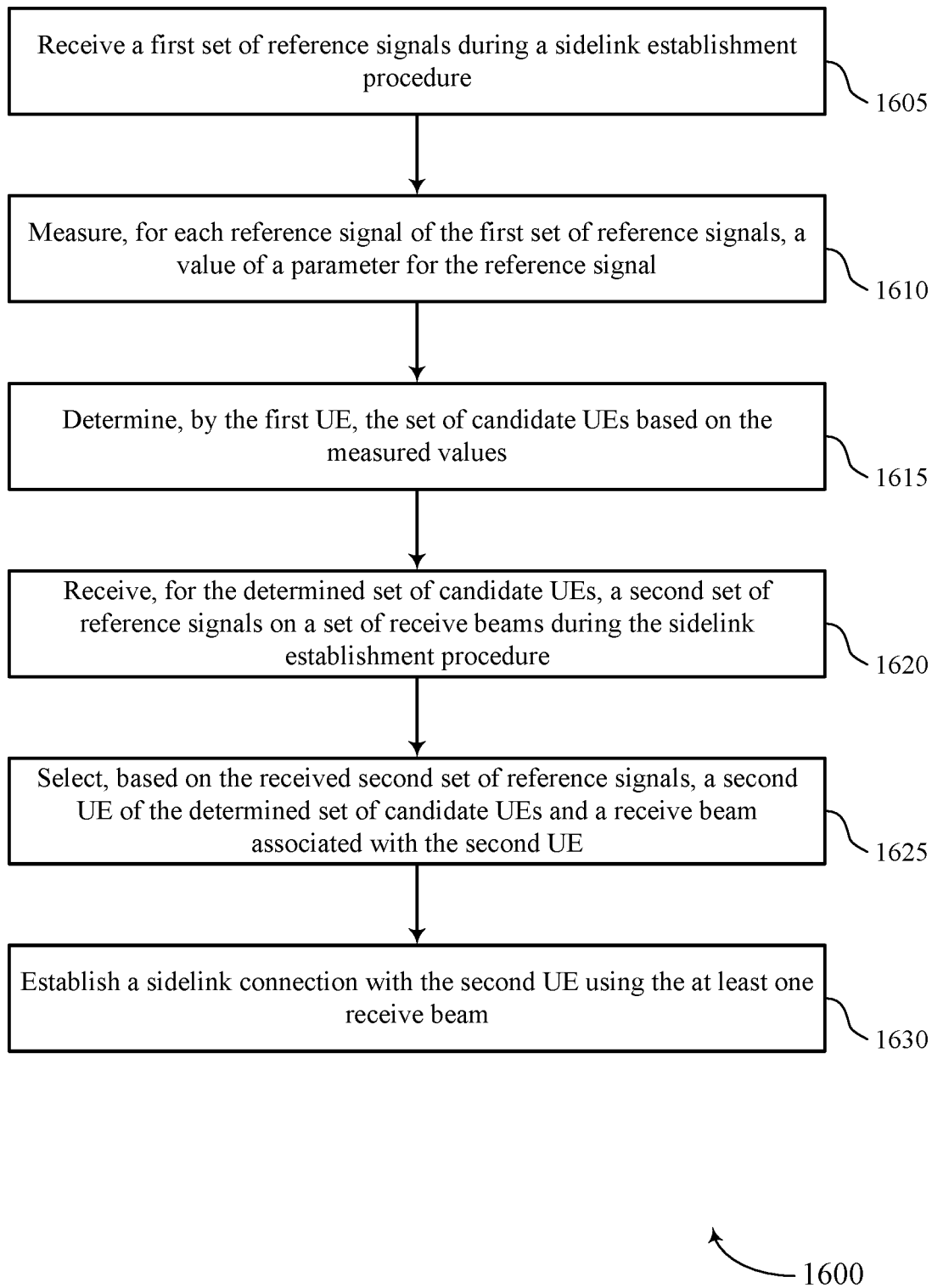

FIG. 16 shows a flowchart illustrating a method 1600 that supports methods for beam management in millimeter wave relays in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a first set of reference signals during a sidelink establishment procedure. The operations of 1605 may be performed according to the methods described herein. In some examples, aspects of the operations of 1605 may be performed by a reference signal receiver as described with reference to FIGS. 6 through 9.

At 1610, the UE may measure, for each reference signal of the first set of reference signals, a value of a parameter for the reference signal. The operations of 1610 may be performed according to the methods described herein. In some examples, aspects of the operations of 1610 may be performed by a signal measurement component as described with reference to FIGS. 6 through 9.

At 1615, the UE may determine, by the first UE, the set of candidate UEs based on the measured values. The operations of 1615 may be performed according to the methods described herein. In some examples, aspects of the operations of 1615 may be performed by an UE selection component as described with reference to FIGS. 6 through 9.

At 1620, the UE may receive, for the determined set of candidate UEs, a second set of reference signals on a set of receive beams during the sidelink establishment procedure. The operations of 1620 may be performed according to the methods described herein. In some examples, aspects of the operations of 1620 may be performed by a reference signal receiver as described with reference to FIGS. 6 through 9.

At 1625, the UE may select, based on the received second set of reference signals, a second UE of the determined set of candidate UEs and a receive beam associated with the second UE. The operations of 1625 may be performed according to the methods described herein. In some examples, aspects of the operations of 1625 may be performed by an UE selection component as described with reference to FIGS. 6 through 9.

At 1630, the UE may establish a sidelink connection with the second UE using the at least one receive beam. The operations of 1630 may be performed according to the methods described herein. In some examples, aspects of the operations of 1630 may be performed by a sidelink connection component as described with reference to FIGS. 6 through 9.

Figure 17:
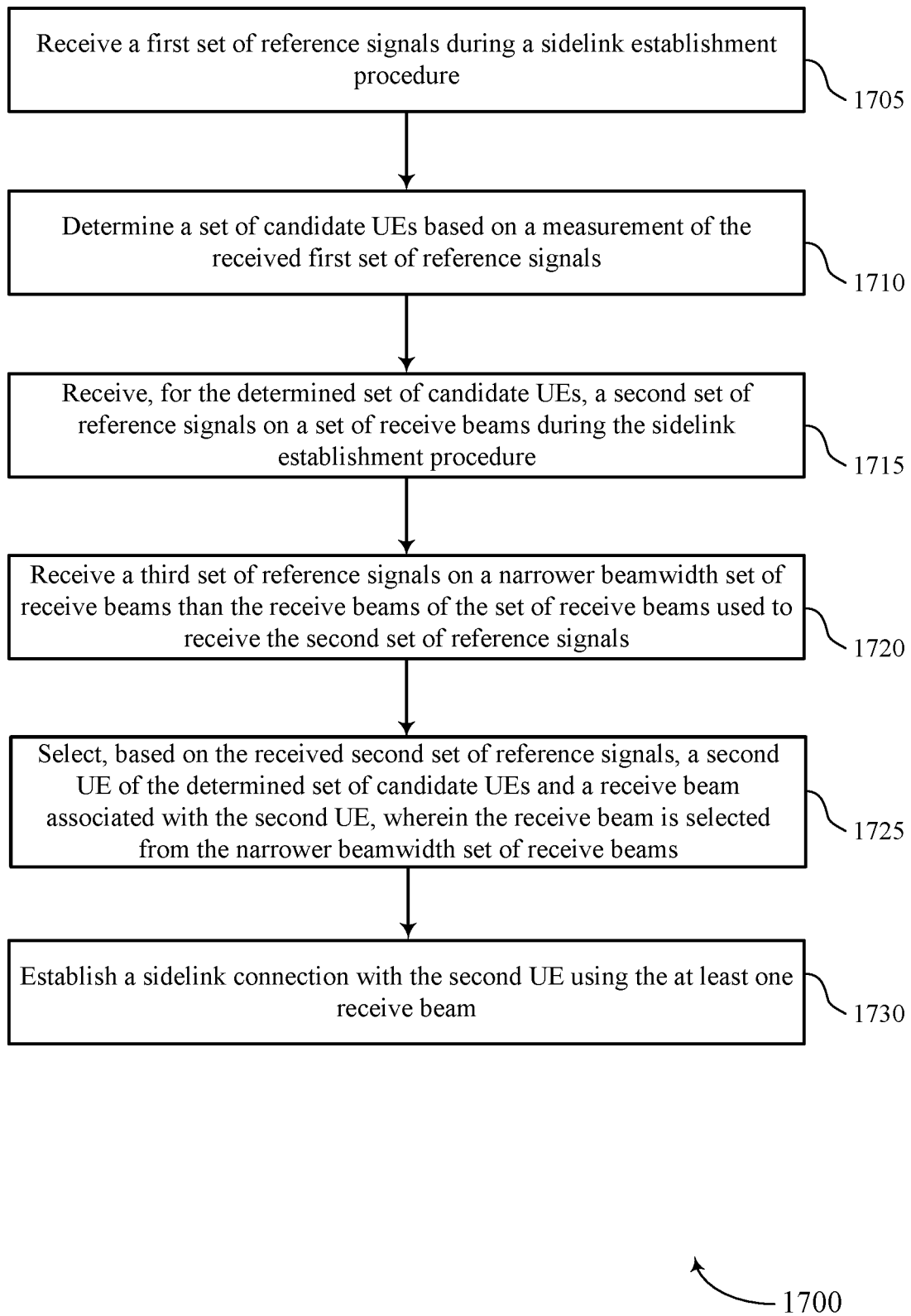

FIG. 17 shows a flowchart illustrating a method 1700 that supports methods for beam management in millimeter wave relays in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive a first set of reference signals during a sidelink establishment procedure. The operations of 1705 may be performed according to the methods described herein. In some examples, aspects of the operations of 1705 may be performed by a reference signal receiver as described with reference to FIGS. 6 through 9.

At 1710, the UE may determine a set of candidate UEs based on a measurement of the received first set of reference signals. The operations of 1710 may be performed according to the methods described herein. In some examples, aspects of the operations of 1710 may be performed by a sidelink candidate component as described with reference to FIGS. 6 through 9.

At 1715, the UE may receive, for the determined set of candidate UEs, a second set of reference signals on a set of receive beams during the sidelink establishment procedure. The operations of 1715 may be performed according to the methods described herein. In some examples, aspects of the operations of 1715 may be performed by a reference signal receiver as described with reference to FIGS. 6 through 9.

At 1720, the UE may receive a third set of reference signals on a narrower beamwidth set of receive beams than the receive beams of the set of receive beams used to receive the second set of reference signals. The operations of 1720 may be performed according to the methods described herein. In some examples, aspects of the operations of 1720 may be performed by a reference signal receiver as described with reference to FIGS. 6 through 9.

At 1725, the UE may select, based on the received second set of reference signals, a second UE of the determined set of candidate UEs and a receive beam associated with the second UE. In some examples, the UE may select the receive beam from the narrower beamwidth set of receive beams. The operations of 1725 may be performed according to the methods described herein. In some examples, aspects of the operations of 1725 may be performed by an UE selection component as described with reference to FIGS. 6 through 9.

At 1730, the UE may establish a sidelink connection with the second UE using the at least one receive beam. The operations of 1730 may be performed according to the methods described herein. In some examples, aspects of the operations of 1730 may be performed by a sidelink connection component as described with reference to FIGS. 6 through 9.

Figure 18:
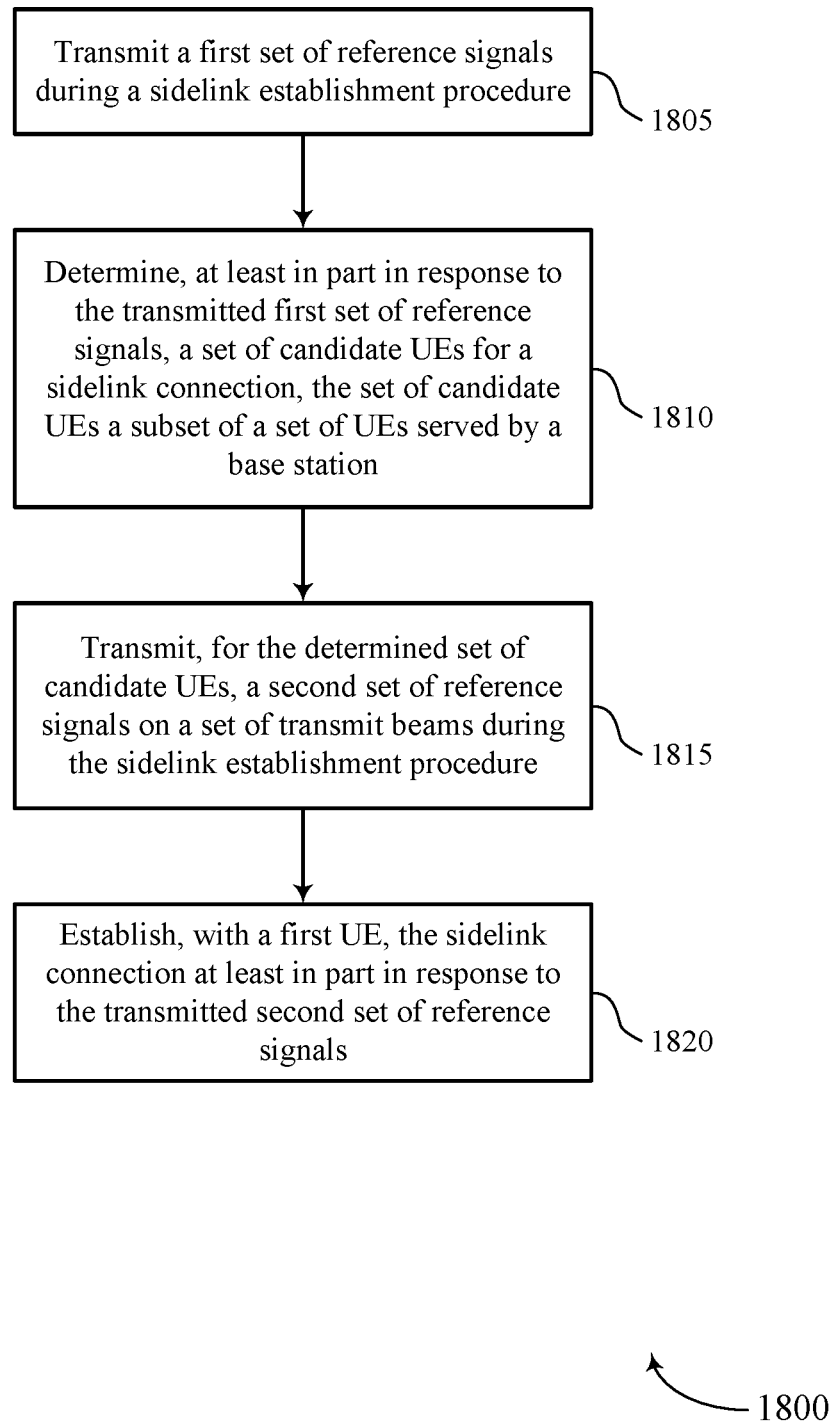

FIG. 18 shows a flowchart illustrating a method 1800 that supports methods for beam management in millimeter wave relays in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may transmit a first set of reference signals during a sidelink establishment procedure. The operations of 1805 may be performed according to the methods described herein. In some examples, aspects of the operations of 1805 may be performed by a transmit beam component as described with reference to FIGS. 6 through 9.

At 1810, the UE may determine, at least in part in response to the transmitted first set of reference signals, a set of candidate UEs for a sidelink connection, the set of candidate UEs a subset of a set of UEs served by a base station. The operations of 1810 may be performed according to the methods described herein. In some examples, aspects of the operations of 1810 may be performed by an UE selection component as described with reference to FIGS. 6 through 9.

At 1815, the UE may transmit, for the determined set of candidate UEs, a second set of reference signals on a set of transmit beams during the sidelink establishment procedure. The operations of 1815 may be performed according to the methods described herein. In some examples, aspects of the operations of 1815 may be performed by a transmit beam component as described with reference to FIGS. 6 through 9.

At 1820, the UE may establish, with a first UE, the sidelink connection at least in part in response to the transmitted second set of reference signals. The operations of 1820 may be performed according to the methods described herein. In some examples, aspects of the operations of 1820 may be performed by a sidelink connection component as described with reference to FIGS. 6 through 9.

Figure 19:
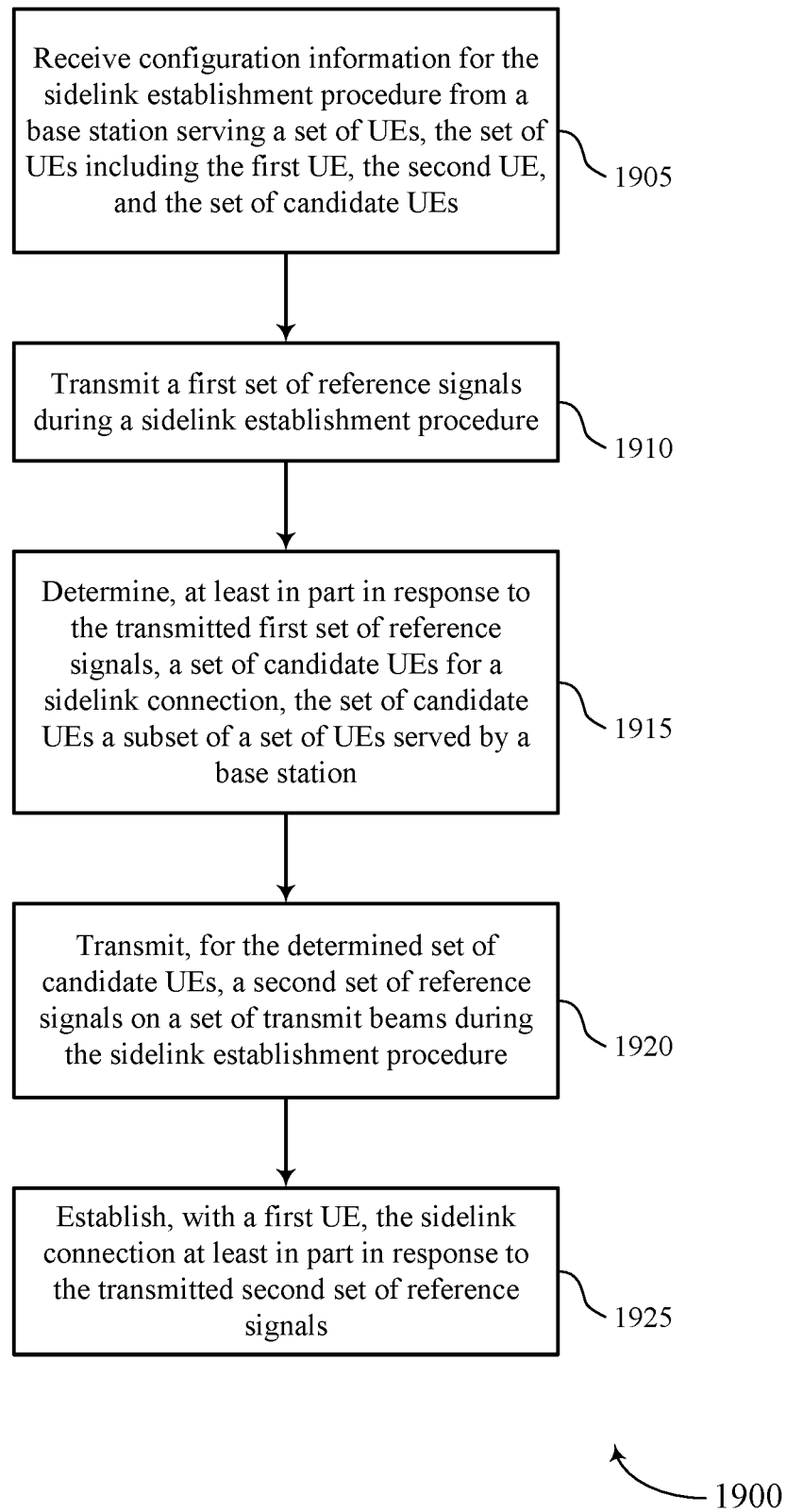

FIG. 19 shows a flowchart illustrating a method 1900 that supports methods for beam management in millimeter wave relays in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive configuration information for the sidelink establishment procedure from a base station serving a set of UEs, the set of UEs including the first UE, the second UE, and the set of candidate UEs. The operations of 1905 may be performed according to the methods described herein. In some examples, aspects of the operations of 1905 may be performed by a configuration information component as described with reference to FIGS. 6 through 9.

At 1910, the UE may transmit a first set of reference signals during a sidelink establishment procedure. The operations of 1910 may be performed according to the methods described herein. In some examples, aspects of the operations of 1910 may be performed by a transmit beam component as described with reference to FIGS. 6 through 9.

At 1915, the UE may determine, at least in part in response to the transmitted first set of reference signals, a set of candidate UEs for a sidelink connection, the set of candidate UEs a subset of a set of UEs served by a base station. The operations of 1915 may be performed according to the methods described herein. In some examples, aspects of the operations of 1915 may be performed by an UE selection component as described with reference to FIGS. 6 through 9.

At 1920, the UE may transmit, for the determined set of candidate UEs, a second set of reference signals on a set of transmit beams during the sidelink establishment procedure. The operations of 1920 may be performed according to the methods described herein. In some examples, aspects of the operations of 1920 may be performed by a transmit beam component as described with reference to FIGS. 6 through 9.

At 1925, the UE may establish, with a first UE, the sidelink connection at least in part in response to the transmitted second set of reference signals. The operations of 1925 may be performed according to the methods described herein. In some examples, aspects of the operations of 1925 may be performed by a sidelink connection component as described with reference to FIGS. 6 through 9.

Figure 20:
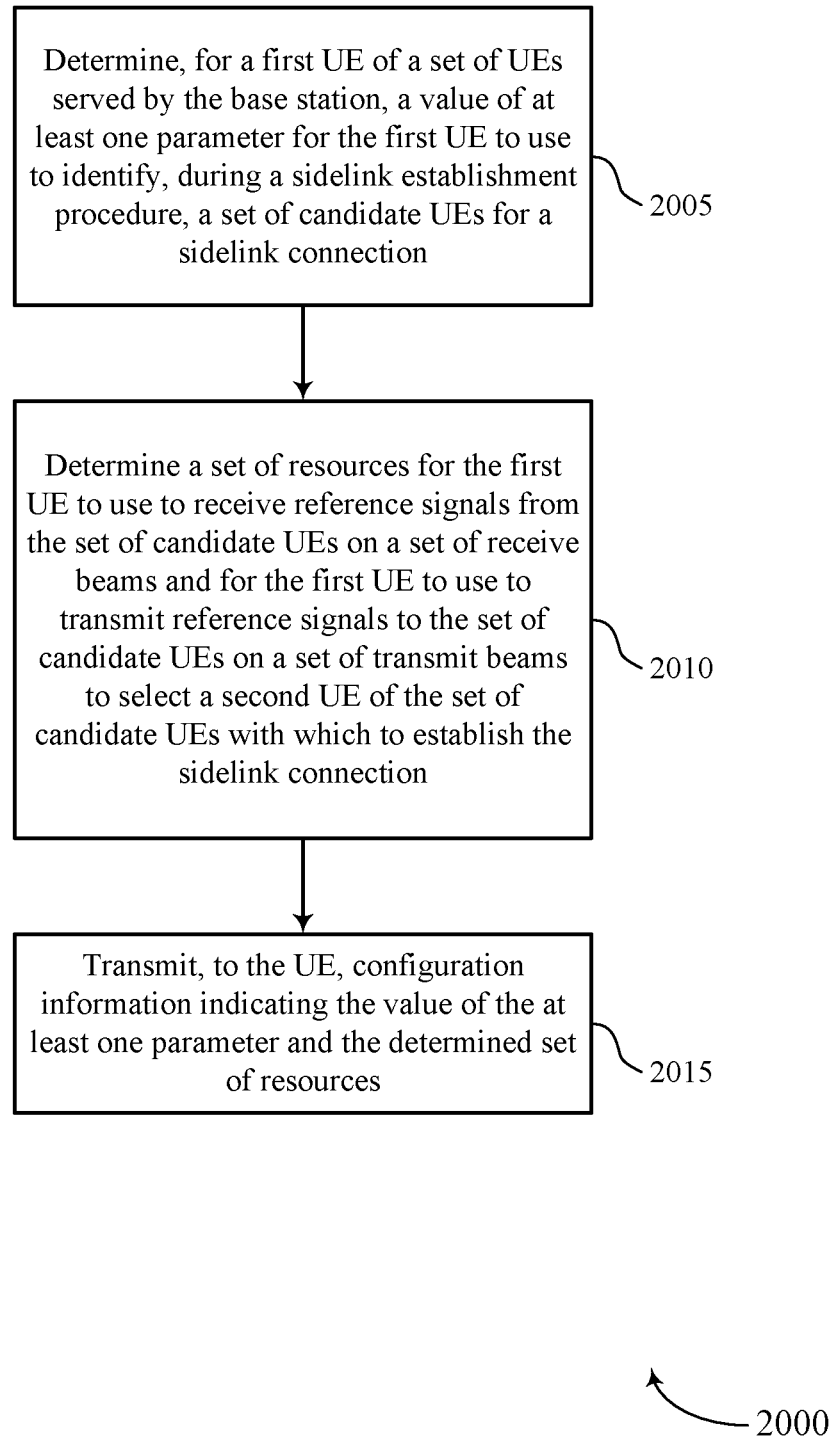

FIG. 20 shows a flowchart illustrating a method 2000 that supports methods for beam management in millimeter wave relays in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may determine, for a first UE of a set of UEs served by the base station, a value of at least one parameter for the first UE to use to identify, during a sidelink establishment procedure, a set of candidate UEs for a sidelink connection. The operations of 2005 may be performed according to the methods described herein. In some examples, aspects of the operations of 2005 may be performed by a candidate parameter component as described with reference to FIGS. 10 through 13.

At 2010, the base station may determine a set of resources for the first UE to use to receive reference signals from the set of candidate UEs on a set of receive beams and for the first UE to use to transmit reference signals to the set of candidate UEs on a set of transmit beams to select a second UE of the set of candidate UEs with which to establish the sidelink connection. The operations of 2010 may be performed according to the methods described herein. In some examples, aspects of the operations of 2010 may be performed by a resource component as described with reference to FIGS. 10 through 13.

At 2015, the base station may transmit, to the UE, configuration information indicating the value of the at least one parameter and the determined set of resources. The operations of 2015 may be performed according to the methods described herein. In some examples, aspects of the operations of 2015 may be performed by a configuration information component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    receiving a first set of reference signals during a sidelink establishment procedure;
    determining a set of candidate UEs based at least in part on a measurement of the received first set of reference signals;
    receiving, for the determined set of candidate UEs, a second set of reference signals on a set of receive beams during the sidelink establishment procedure;
    selecting, based at least in part on the received second set of reference signals, a second UE of the determined set of candidate UEs and a receive beam associated with the second UE; and
    establishing a sidelink connection with the second UE using the at least one receive beam.

2. The method of claim 1, wherein determining the set of candidate UEs based at least in part on the measurement of the received first set of reference signals comprises:
    measuring, for each reference signal of the first set of reference signals, a value of a parameter for the reference signal;
    transmitting the measured values to a base station; and
    receiving, from the base station, an indication of the set of candidate UEs.

3. The method of claim 1, wherein determining the set of candidate UEs based at least in part on the measurement of the received first set of reference signals comprises:
    measuring, for each reference signal of the first set of reference signals, a value of a parameter for the reference signal; and
    determining, by the first UE, the set of candidate UEs based at least in part on the measured values.

4. The method of claim 1, wherein selecting the receive beam further comprises:
    receiving a third set of reference signals on a narrower beamwidth set of receive beams than the receive beams of the set of receive beams used to receive the second set of reference signals; and
    selecting the receive beam from the narrower beamwidth set of receive beams.

5. The method of claim 1, further comprising:
    receiving configuration information for the sidelink establishment procedure from a base station serving a plurality of UEs, including the first UE and the set of candidate UEs.

6. The method of claim 5, wherein the configuration information indicates time-frequency resources for the first set of reference signals, wherein the first set of reference signals comprise synchronization signal blocks, sounding reference signals, channel state information reference signals, or sidelink discovery reference signals, or a combination thereof.

7. The method of claim 1, wherein the set of candidate UEs for the sidelink connection is determined further based at least in part on a privacy or security parameter associated with the set of candidate UEs.

8. The method of claim 1, wherein each receive beam of the set of receive beams used to receive the first set of reference signals is broader in beamwidth than each receive beam of the set of receive beams used to receive the second set of reference signals.

9. The method of claim 1, wherein each receive beam of the set of receive beams used to receive the first set of reference signals has a lower array gain than each receive beam of the set of receive beams used to receive the second set of reference signals, wherein having the lower array gain comprises having a lower received signal strength indicator, a lower reference signal received power, a lower reference signal received quality, a lower signal to noise ratio, or a lower signal to interference and noise ratio, or a combination thereof.

10. The method of claim 1, wherein:
the first set of reference signals are received in a first radio frequency spectrum band; and
the second set of reference signals are received in a second radio frequency spectrum band different than the first radio frequency spectrum band.

11. A method for wireless communication at a second user equipment (UE), comprising:
transmitting a first set of reference signals during a sidelink establishment procedure;
determining, at least in part in response to the transmitted first set of reference signals, a set of candidate UEs for a sidelink connection, the set of candidate UEs a subset of a plurality of UEs served by a base station;
transmitting, for the determined set of candidate UEs, a second set of reference signals on a set of transmit beams during the sidelink establishment procedure; and
establishing, with a first UE, the sidelink connection at least in part in response to the transmitted second set of reference signals.

12. The method of claim 11, wherein selecting the transmit beam further comprises:
transmitting a third set of reference signals on a narrower beamwidth set of transmit beams than the transmit beams of the set of transmit beams used to transmit the second set of reference signals; and
selecting the transmit beam from the narrower beamwidth set of transmit beams.

13. The method of claim 11, further comprising:
receiving configuration information for the sidelink establishment procedure from the base station serving the plurality of UEs, the plurality of UEs including the first UE, the second UE, and the set of candidate UEs.

14. The method of claim 13, wherein the configuration information indicates time-frequency resources for the first set of reference signals, wherein the first set of reference signals comprise synchronization signal blocks, sounding reference signals, channel state information reference signals, sidelink discovery reference signals, or a combination thereof.

15. The method of claim 11, wherein the set of candidate UEs for the sidelink connection is determined further based at least in part on a privacy or security parameter associated with the set of candidate UEs.

16. The method of claim 11, wherein each transmit beam of the set of transmit beams used to transmit the first set of reference signals is broader in beamwidth than each transmit beam of the set of transmit beams used to transmit the second set of reference signals.

17. The method of claim 11, wherein each transmit beam of the set of transmit beams used to transmit the first set of reference signals has a lower array gain than each transmit beam of the set of transmit beams used to transmit the second set of reference signals, wherein having the lower array gain comprises having a lower received signal strength indicator, a lower reference signal received power, a lower reference signal received quality, a lower signal to noise ratio, or a lower signal to interference and noise ratio, or a combination thereof.

18. The method of claim 11, wherein the first set of reference signals are transmitted using pseudo- or quasi-omnidirectional beams that target and cover a broader spatial area.

19. The method of claim 11, wherein:
the first set of reference signals are transmitted in a first radio frequency spectrum band; and
the second set of reference signals are transmitted in a second radio frequency spectrum band different than the first radio frequency spectrum band.

20. An apparatus for wireless communication at a first user equipment (UE), comprising:
a processor,
memory coupled with the processor; and
instructions stored in the memory and executable by the processor to cause the apparatus to:
receive a first set of reference signals during a sidelink establishment procedure;
determine a set of candidate UEs based at least in part on a measurement of the received first set of reference signals;
receive, for the determined set of candidate UEs, a second set of reference signals on a set of receive beams during the sidelink establishment procedure;
select, based at least in part on the received second set of reference signals, a second UE of the determined set of candidate UEs and a receive beam associated with the second UE; and
establish a sidelink connection with the second UE using the at least one receive beam.

21. The apparatus of claim 20, wherein the instructions to determine the set of candidate UEs based at least in part on the measurement of the received first set of reference signals are executable by the processor to cause the apparatus to:
measure, for each reference signal of the first set of reference signals, a value of a parameter for the reference signal;
transmit the measured values to a base station; and
receive, from the base station, an indication of the set of candidate UEs.

22. The apparatus of claim 20, wherein the instructions to determine the set of candidate UEs based at least in part on the measurement of the received first set of reference signals are executable by the processor to cause the apparatus to:
measure, for each reference signal of the first set of reference signals, a value of a parameter for the reference signal; and
determine, by the first UE, the set of candidate UEs based at least in part on the measured values.

23. The apparatus of claim 20, wherein the instructions to select the receive beam further are executable by the processor to cause the apparatus to:
receive a third set of reference signals on a narrower beamwidth set of receive beams than the receive beams of the set of receive beams used to receive the second set of reference signals; and
select the receive beam from the narrower beamwidth set of receive beams.

24. The apparatus of claim 20, wherein the instructions are further executable by the processor to cause the apparatus to:

receive configuration information for the sidelink establishment procedure from a base station serving a plurality of UEs, including the first UE and the set of candidate UEs.

25. The apparatus of claim 24, wherein the configuration information indicates time-frequency resources for the first set of reference signals, wherein the first set of reference signals comprise synchronization signal blocks, sounding reference signals, channel state information reference signals, or sidelink discovery reference signals, or a combination thereof.

26. An apparatus for wireless communication at a second user equipment (UE), comprising:
    a processor;
    memory coupled with the processor; and
    instructions stored in the memory and executable by the processor to cause the apparatus to:
        transmit a first set of reference signals during a sidelink establishment procedure;
        determine, at least in part in response to the transmitted first set of reference signals, a set of candidate UEs for a sidelink connection, the set of candidate UEs a subset of a plurality of UEs served by a base station;
        transmit, for the determined set of candidate UEs, a second set of reference signals on a set of transmit beams during the sidelink establishment procedure; and
        establish, with a first UE, the sidelink connection at least in part in response to the transmitted second set of reference signals.

27. The apparatus of claim 26, wherein the instructions to select the transmit beam further are executable by the processor to cause the apparatus to:
    transmit a third set of reference signals on a narrower beamwidth set of transmit beams than the transmit beams of the set of transmit beams used to transmit the second set of reference signals; and
    select the transmit beam from the narrower beamwidth set of transmit beams.

28. The apparatus of claim 26, wherein the instructions are further executable by the processor to cause the apparatus to:
    receive configuration information for the sidelink establishment procedure from the base station serving the plurality of UEs, the plurality of UEs including the first UE, the second UE, and the set of candidate UEs.

29. The apparatus of claim 26, wherein each transmit beam of the set of transmit beams used to transmit the first set of reference signals is broader in beamwidth than each transmit beam of the set of transmit beams used to transmit the second set of reference signals.

30. The apparatus of claim 26, wherein each transmit beam of the set of transmit beams used to transmit the first set of reference signals has a lower array gain than each transmit beam of the set of transmit beams used to transmit the second set of reference signals, wherein having the lower array gain comprises having a lower received signal strength indicator, a lower reference signal received power, a lower reference signal received quality, a lower signal to noise ratio, or a lower signal to interference and noise ratio, or a combination thereof.

* * * * *